US011148697B2

(12) United States Patent
Akamatsu et al.

(10) Patent No.: US 11,148,697 B2
(45) Date of Patent: Oct. 19, 2021

(54) AUTOMATIC GUIDED VEHICLE AND METHOD FOR CONTROLLING AUTOMATIC GUIDED VEHICLE

(71) Applicant: NIDEC-SHIMPO CORPORATION, Kyoto (JP)

(72) Inventors: Masahiro Akamatsu, Kyoto (JP); Hiroki Akamatsu, Kyoto (JP); Norio Deguchi, Kyoto (JP); Syunta Sato, Kyoto (JP); Hitoshi Inoue, Kyoto (JP)

(73) Assignee: NIDEC-SHIMPO CORPORATION, Kyoto (JP)

( * ) Notice: Subject to any disclaimer, the term of this patent is extended or adjusted under 35 U.S.C. 154(b) by 344 days.

(21) Appl. No.: 16/320,087

(22) PCT Filed: Jul. 27, 2017

(86) PCT No.: PCT/JP2017/027243
§ 371 (c)(1),
(2) Date: Jan. 23, 2019

(87) PCT Pub. No.: WO2018/021474
PCT Pub. Date: Feb. 1, 2018

(65) Prior Publication Data
US 2019/0270472 A1 Sep. 5, 2019

(30) Foreign Application Priority Data

Jul. 29, 2016 (JP) .............................. JP2016-149864
Jun. 20, 2017 (JP) .............................. JP2017-120730

(51) Int. Cl.
*B62B 5/00* (2006.01)
*B62B 3/00* (2006.01)

(52) U.S. Cl.
CPC ............ *B62B 5/0079* (2013.01); *B62B 3/002* (2013.01); *B62B 5/0026* (2013.01);
(Continued)

(58) Field of Classification Search
CPC .............. B62B 5/0079; B62B 2207/00; B62B 2205/20; B62B 2207/02; B62B 5/0026; B62B 5/0093; B62B 3/002
See application file for complete search history.

(56) References Cited

U.S. PATENT DOCUMENTS

| 4,077,535 A * | 3/1978 | Oriol | A61G 12/001 |
| | | | 180/14.1 |
| 7,712,558 B2 * | 5/2010 | Helson | B62B 5/0079 |
| | | | 180/19.3 |

(Continued)

FOREIGN PATENT DOCUMENTS

| JP | S4891715 | 11/1973 |
| JP | S56110058 | 8/1981 |

(Continued)

OTHER PUBLICATIONS

"International Search Report (Form PCT/ISA/210) of PCT/JP2017/027243," dated Aug. 29, 2017, with English translation thereof, pp. 1-4.

*Primary Examiner* — Minnah L Seoh
*Assistant Examiner* — Marlon A Arce
(74) *Attorney, Agent, or Firm* — JCIPRNET

(57) ABSTRACT

An automatic guided vehicle according to one aspect of the present invention moves a trolley including a trolley body, wheels attached to the trolley body, and a section to be connected which is provided on the lower surface of the trolley body. The automatic guided vehicle is provided with: a vehicle body; drive wheels attached to the vehicle body; and a connection mechanism which is connected to the trolley, wherein the connection mechanism includes a connecting section disposed on an upper side of the upper surface of the vehicle body so as to be movable horizontally in a first direction, and includes a drive apparatus which moves the connecting section in the first direction and (Continued)

connects the connecting section to the section to be connected.

17 Claims, 14 Drawing Sheets

(52) U.S. Cl.
CPC ......... *B62B 5/0093* (2013.01); *B62B 2205/20* (2013.01); *B62B 2207/00* (2013.01); *B62B 2207/02* (2013.01)

(56) References Cited

U.S. PATENT DOCUMENTS

| | | | |
|---|---|---|---|
| 7,871,234 B2 * | 1/2011 | Yuyama | A61G 12/001 |
| | | | 414/498 |
| 10,597,273 B2 * | 3/2020 | Sokuza | B66F 9/063 |
| 10,899,376 B2 * | 1/2021 | Bauer | B62B 5/005 |
| 2006/0024150 A1 * | 2/2006 | Gregory | B65F 1/1473 |
| | | | 414/495 |
| 2007/0172341 A1 * | 7/2007 | Gregory | B65F 1/1468 |
| | | | 414/495 |

FOREIGN PATENT DOCUMENTS

| | | |
|---|---|---|
| JP | H07205625 | 8/1995 |
| JP | 2005297809 | 10/2005 |
| JP | 2006116978 | 5/2006 |
| JP | 2011219006 | 11/2011 |
| JP | 2012025306 | 2/2012 |
| JP | 5132471 | 1/2013 |
| JP | 2013208922 | 10/2013 |
| JP | 2015202763 | 11/2015 |

* cited by examiner

AUTOMATIC GUIDED VEHICLE AND METHOD FOR CONTROLLING AUTOMATIC GUIDED VEHICLE

CROSS-REFERENCE TO RELATED APPLICATION

This application is a 371 application of the International PCT application serial no. PCT/JP2017/027243, filed on Jul. 27, 2017, which claims the priority benefits of Japan Patent Application No. 2016-149864, filed on Jul. 29, 2016, and Japan Patent Application No. 2017-120730, filed on Jun. 20, 2017. The entirety of each of the above-mentioned patent applications is hereby incorporated by reference herein and made a part of this specification.

TECHNICAL FIELD

The present invention relates to an automatic guided vehicle and a method of controlling the automatic guided vehicle.

BACKGROUND ART

A trolley towing vehicle configured to tow a trolley is known. For example, the trolley towing vehicle disclosed in Patent Literature 1 has a connecting pin elevation mechanism configured to elevate a connecting pin to connect with the trolley. In Patent Literature 1, the trolley is connected to the trolley towing vehicle by inserting the connecting pin lifted by the connecting pin elevation mechanism into an opening formed in the trolley.

CITATION LIST

Patent Literature

Patent Literature 1

Japanese Unexamined Patent Application Publication No. 2005-297809

SUMMARY OF INVENTION

Technical Problem

In the above-mentioned trolley towing vehicle, since the connecting pin elevation mechanism elevates the connecting pin in a vertical direction, the trolley towing vehicle is likely to be increased in size in a vertical direction. Accordingly, the entire trolley towing vehicle is likely to be increased in size in the vertical direction. Therefore, when the trolley towing vehicle enters below the trolley to tow the trolley, the trolley towing vehicle cannot enter below a low floor trolley, and in many cases, a low floor trolley cannot be towed by the trolley towing vehicle.

In consideration of the above-mentioned problems, one of objectives of the present invention is directed to providing an automatic guided vehicle configured to move a trolley and having a structure that can be reduced in size in a vertical direction, and a method of controlling the same.

Solution to Problem

An aspect of an automatic guided vehicle of the present invention is an automatic guided vehicle configured to move a trolley having a trolley body, wheels attached to the trolley body, and a section to be connected provided on a lower surface of the trolley body, the automatic guided vehicle including: a vehicle body; drive wheels attached to the vehicle body; and a connecting mechanism connected to the trolley, wherein the connecting mechanism has: a connecting section disposed above an upper surface of the vehicle body to be movable in a first direction in a horizontal direction; and a drive apparatus for moving the connecting section in the first direction and connecting the connecting section to the section to be connected.

An aspect of a method of controlling an automatic guided vehicle of the present invention is a method of controlling the automatic guided vehicle, in which the connecting section is a pin extending in the first direction, the section to be connected has an insertion hole into which the connecting section is inserted, the section to be connected has a main body for a section to be connected extending in a second direction crossing the first direction in the horizontal direction, the insertion hole is formed in the main body for a section to be connected, the connecting mechanism has a pair of guide sections extending in the second direction above an upper surface of the vehicle body, the pair of guide sections are disposed to face each other in the first direction via a gap into which the main body for a section to be connected is inserted, one of the pair of guide sections has a first through-hole through which the guide section passes in the first direction, and the connecting section is disposed to be movable through the first through-hole in the first direction, the method including: a process of causing the automatic guided vehicle to enter below the trolley body while advancing in the second direction, and inserting the main body for a section to be connected into the gap; a process of moving the connecting section toward the main body for a section to be connected in the first direction and pressing the connecting section against the main body for a section to be connected when the first through-hole is disposed behind the insertion hole in the second direction; and a process of moving the automatic guided vehicle forward in the second direction and inserting the connecting section into the insertion hole while pressing the connecting section against the main body for a section to be connected.

Advantageous Effects of Invention

According to one of aspects of the present invention, an automatic guided vehicle configured to move a trolley and having a structure that can be reduced in size in a vertical direction, and a method of controlling the same are provided.

DESCRIPTION OF EMBODIMENTS

First Embodiment

Figure 1:
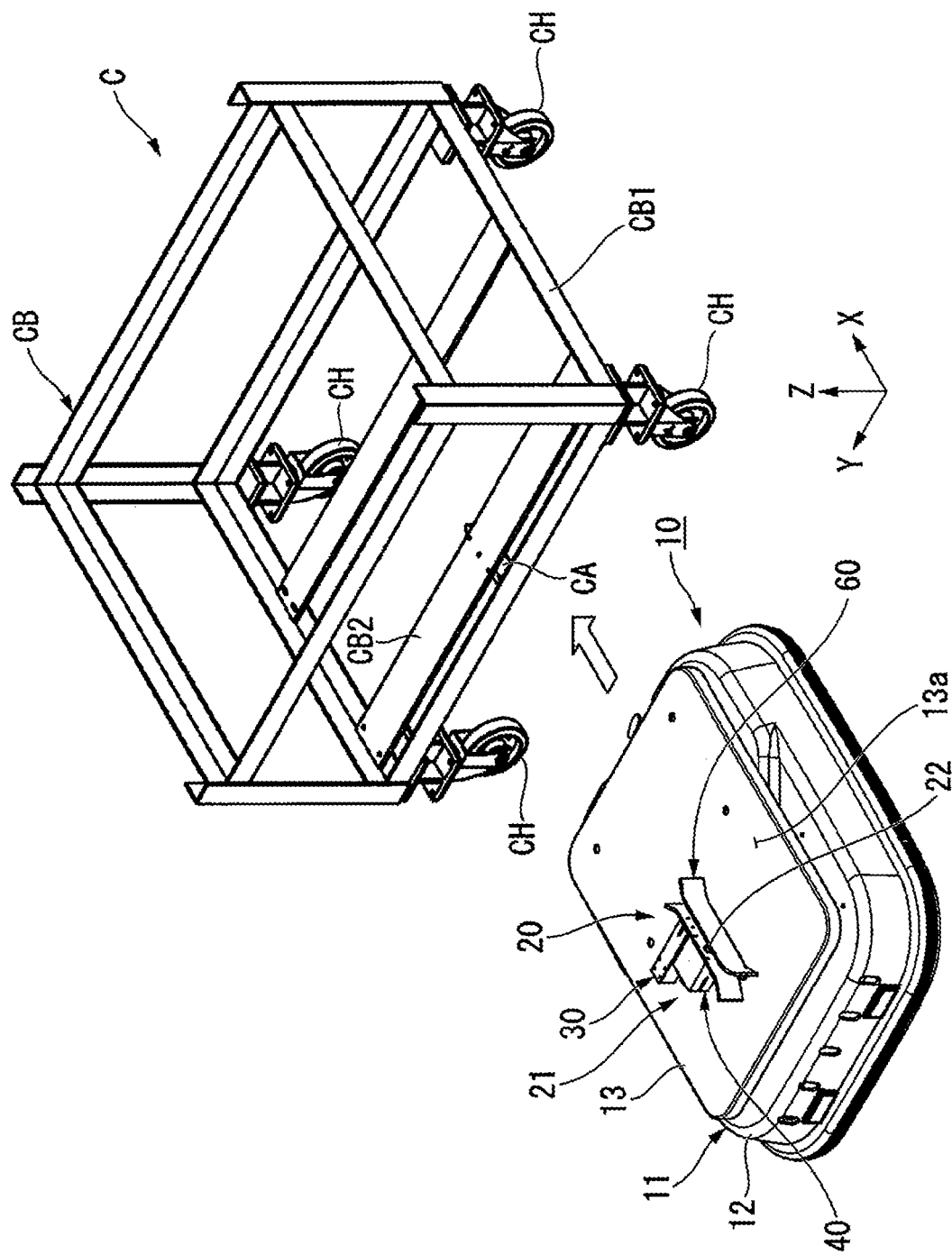
FIG. 1 is a perspective view showing an automatic guided vehicle of a first embodiment.

An automatic guided vehicle 10 of an embodiment shown in FIG. 1 moves a trolley C. The automatic guided vehicle 10 can tow and move the trolley C by the trolley C being connected to the automatic guided vehicle 10.

Here, in a 3-dimensional orthogonal coordinate system shown in each drawing, a Z-axis direction is a vertical direction. An X-axis direction and a Y-axis direction are directions in a horizontal direction perpendicular to the vertical direction, which are perpendicular to each other. The Y-axis direction in the embodiment is a direction parallel to a direction in which a connecting section 22 is movable (which will be described below), which corresponds to a first direction. The X-axis direction in the embodiment is a direction parallel to a direction in which the automatic guided vehicle 10 is moved when the automatic guided vehicle 10 is connected to the trolley C, which corresponds to a second direction. In the following description, the Z-axis direction is referred to as "a vertical direction Z," the Y-axis direction is referred to as "a movable direction Y" and the X-axis direction is referred to as "an entering direction X."

Figure 2:
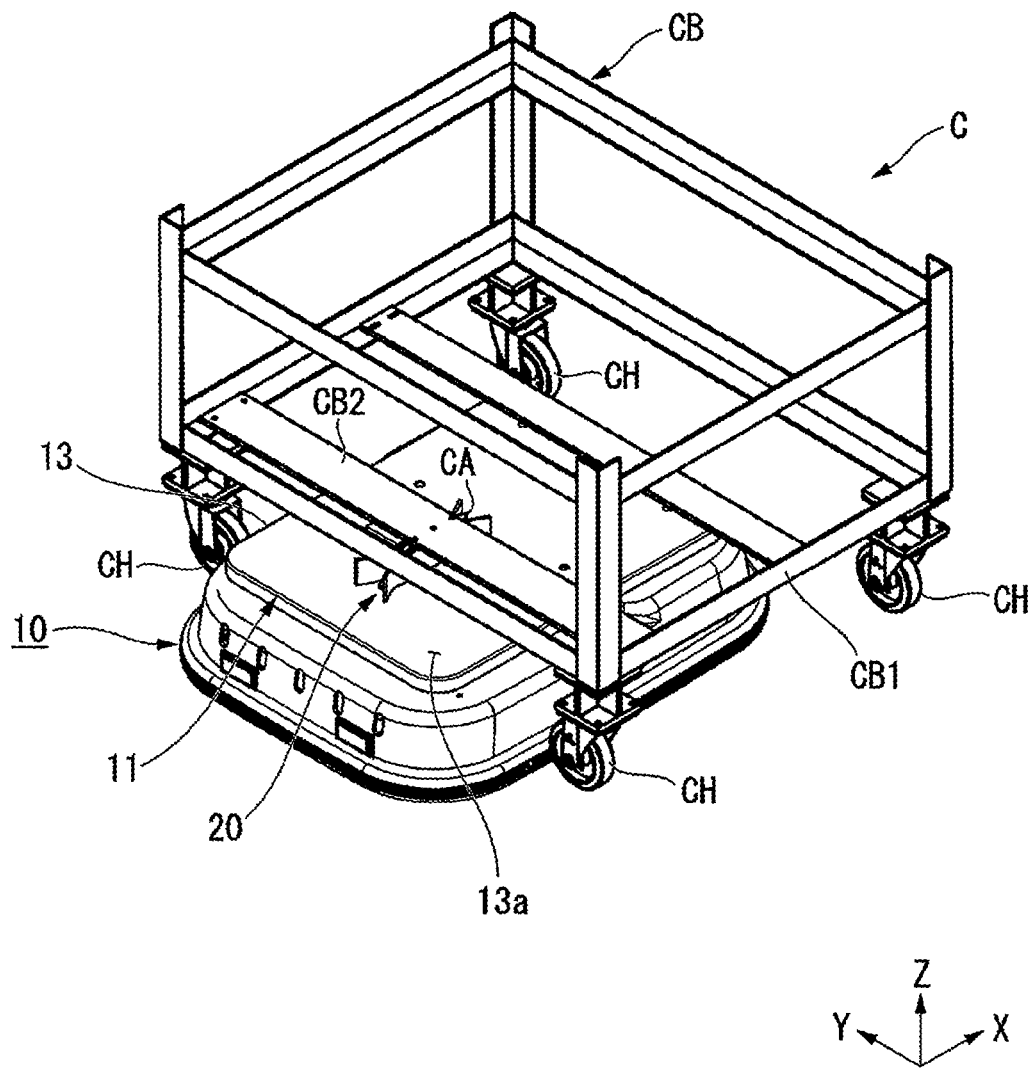
FIG. 2 is a perspective view showing the automatic guided vehicle of the first embodiment.

A positive side in the vertical direction Z is referred to as "an upper side" and a negative side is referred to as "a lower side." A positive side in the entering direction X is referred to as "a front side" and a negative side is referred to as "a rear side." The front side is a side at which the automatic guided vehicle 10 approaches the trolley C when the automatic guided vehicle 10 is connected to the trolley C in a positional relation shown in FIGS. 1 and 2. In the following description, positional relationships between parts will be described in the case in which the automatic guided vehicle 10 and the trolley C are disposed in a posture shown in FIGS. 1 and 2, i.e., in a posture when the automatic guided vehicle 10 is connected to the trolley C.

Further, the automatic guided vehicle 10 can be connected to the trolley C even when the automatic guided vehicle 10 approaches the trolley C from a rear side in FIGS. 1 and 2, in addition to case in which the automatic guided vehicle 10 approaches the trolley C in a direction shown in FIGS. 1 and 2.

Figure 3:
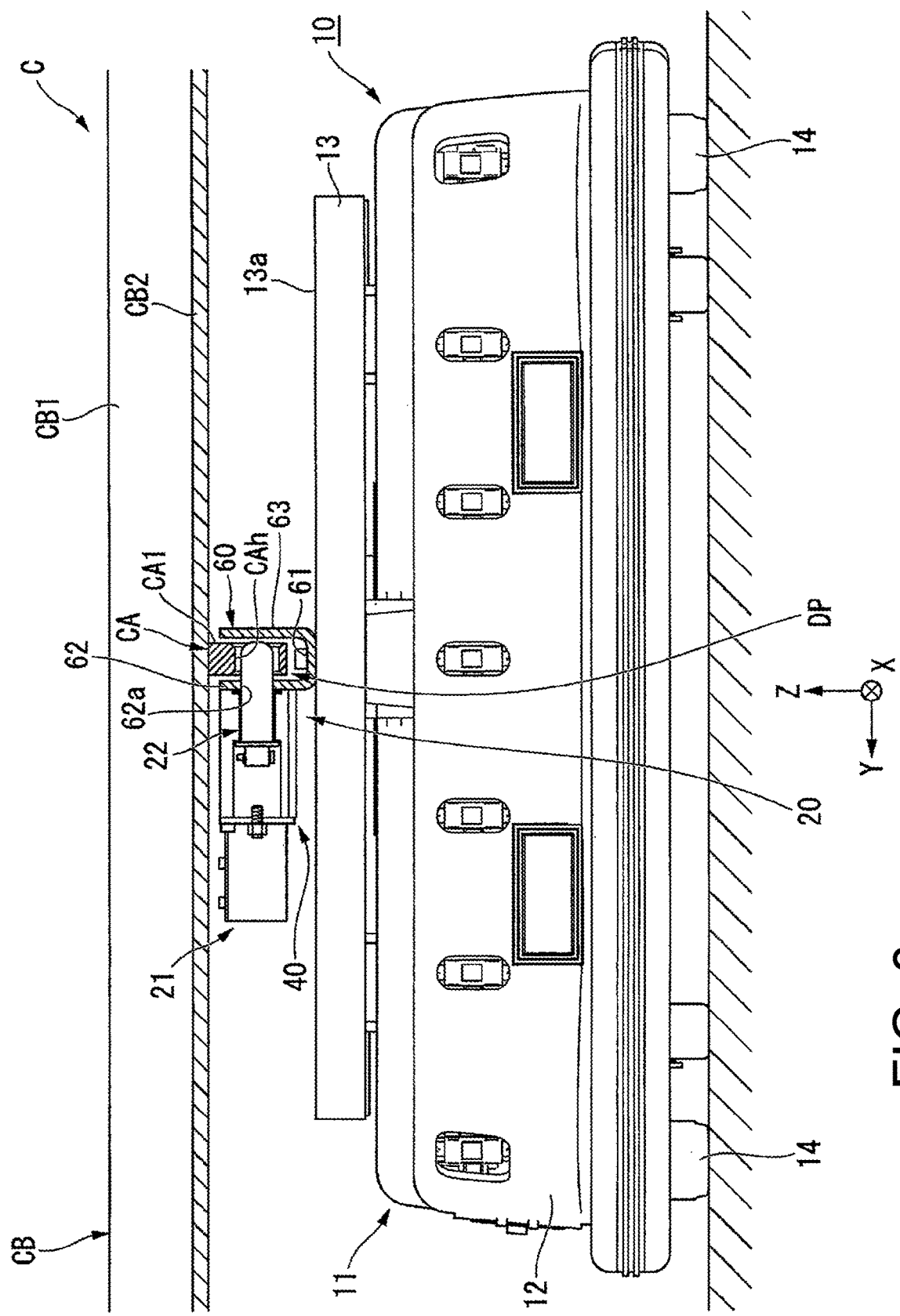
FIG. 3 is a view of the automatic guided vehicle of the first embodiment when seen from a rear side.

As shown in FIGS. 2 and 3, the automatic guided vehicle 10 is connected to the trolley C when the automatic guided vehicle 10 enters below the trolley C. The trolley C has a trolley body CB, wheels CH connected to the trolley body CB, and a section to be connected CA. The trolley body CB has a frame section CB1 having a rectangular frame shape, and an attachment plate section CB2. The wheels CH are attached to lower surfaces of four corners of the frame section CB1, respectively. The attachment plate section CB2 has a plate shape that extends along a horizontal plane perpendicular to the vertical direction Z. The attachment plate section CB2 extends in the movable direction Y. The attachment plate section CB2 connects a pair of sides facing each other in the movable direction Y via a gap in the frame section CB1.

Figure 4:
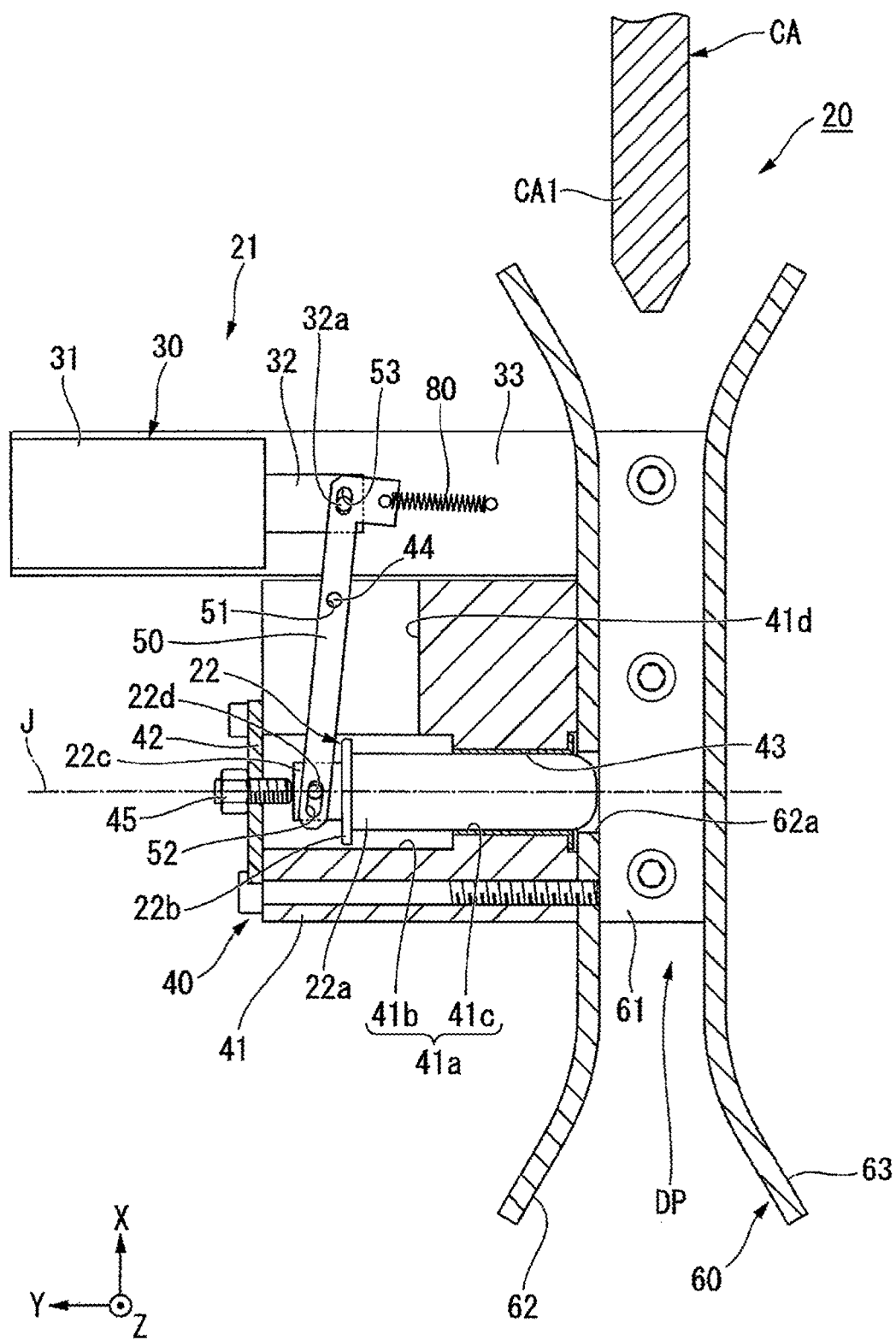
FIG. 4 is a cross-sectional view of a connecting mechanism of the first embodiment when seen from above.
Figure 5:
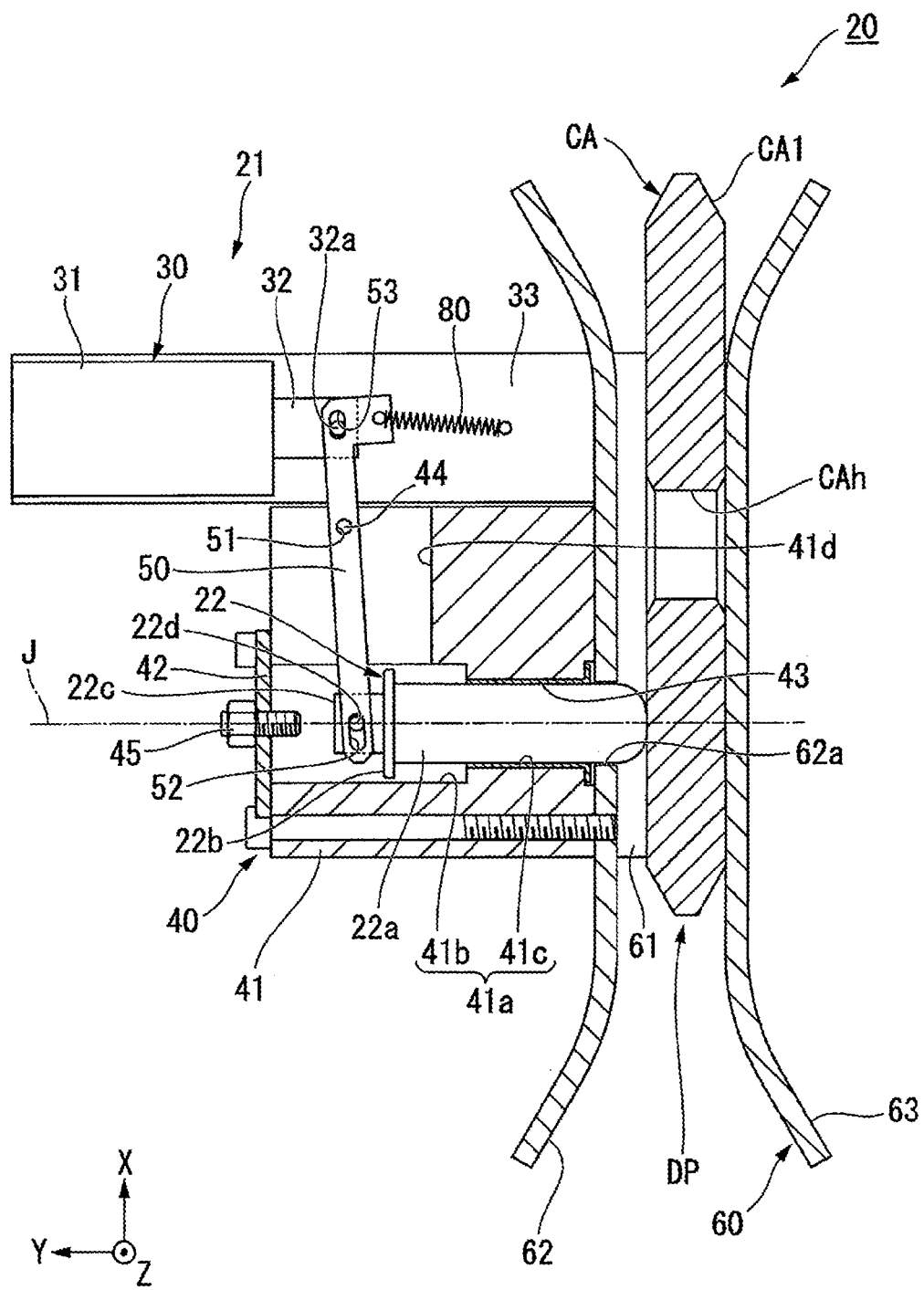
FIG. 5 is a cross-sectional view of the connecting mechanism of the first embodiment when seen from above.
Figure 6:
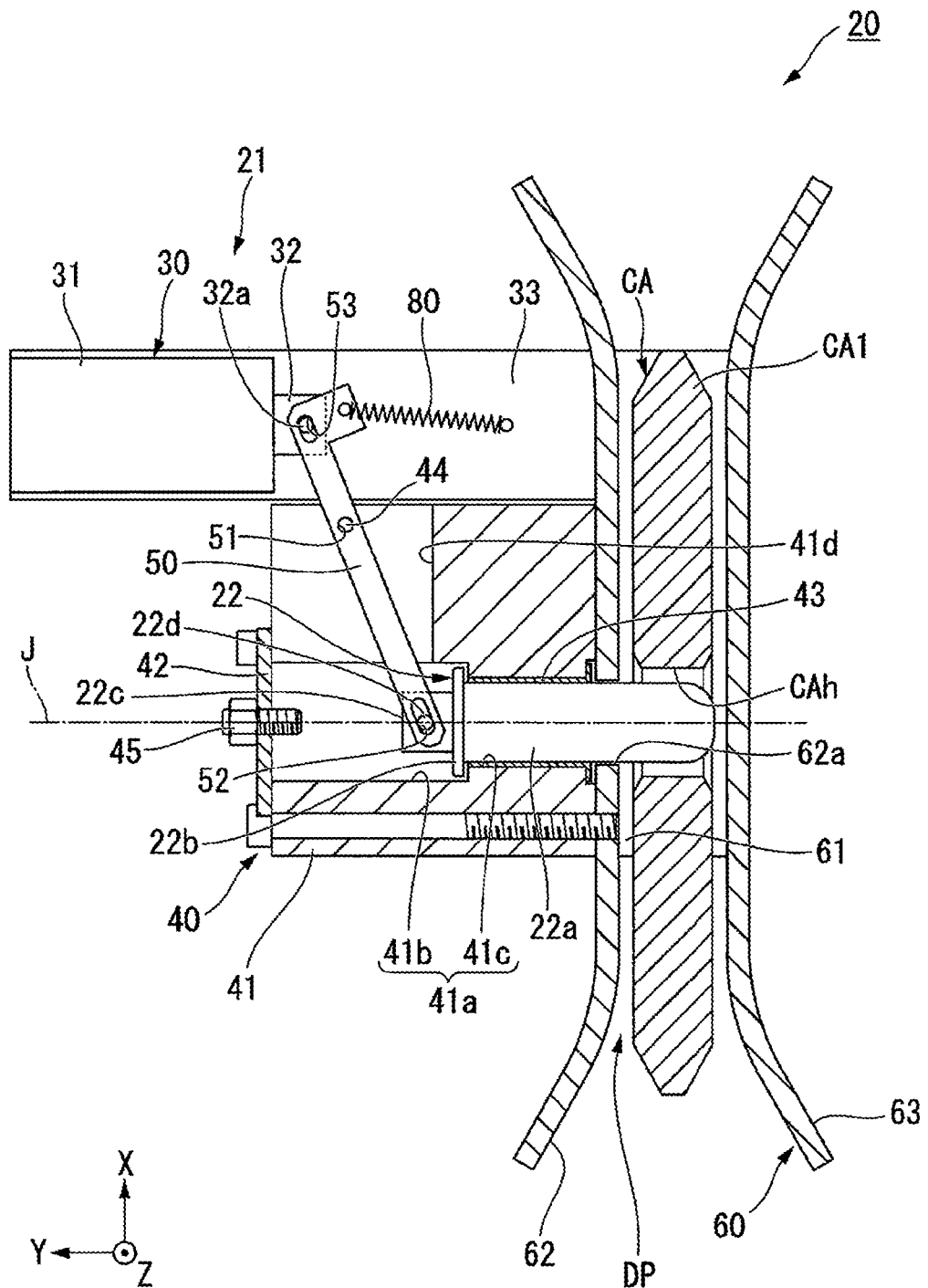
FIG. 6 is a cross-sectional view of the connecting mechanism of the first embodiment when seen from above.

The section to be connected CA is formed on a lower surface of the trolley body CB. More specifically, the section to be connected CA is fixed to a lower surface of the attachment plate section CB2 by a screw. As shown in FIGS. 4 to 6, the section to be connected CA has a main body CA1 for a section to be connected extending in the entering direction X crossing the movable direction Y in the horizontal direction, and an insertion hole CAh provided on the main body CA1 for a section to be connected. The main body CA1 for a section to be connected in the embodiment is the section to be connected CA itself. The insertion hole CAh in the embodiment is a through-hole passing through the main body CA1 for a section to be connected in the movable direction Y. A shape of the insertion hole CAh when seen in the movable direction Y is, for example, a circular shape. Both edges of the insertion hole CAh in the movable direction Y are chamfered. Accordingly, an inner diameter of the insertion hole CAh is increased at both end portions in the movable direction Y. The connecting section 22, which will be described below, is inserted into the insertion hole CAh.

As shown in FIGS. 1 to 3, the automatic guided vehicle 10 includes a vehicle body 11, drive wheels 14 attached to the vehicle body 11, and a connecting mechanism 20. The vehicle body 11 has a vehicle body main body 12 and a top plate 13. As shown in FIG. 3, the plurality of drive wheels 14 are attached to a lower surface of the vehicle body main body 12. The top plate 13 is fixed to an upper surface of the vehicle body main body 12. The top plate 13 has a plate shape extending along a horizontal plane perpendicular to the vertical direction Z. As shown in FIG. 1, a shape of the top plate 13 when seen in a plan view is a substantially rectangular shape elongated in the entering direction X.

The connecting mechanism 20 is connected to the trolley C. As shown in FIGS. 4 to 6, the connecting mechanism 20 has a guide member 60 for a section to be connected, a drive apparatus 21 and the connecting section 22. The connecting mechanism 20 can switch a connection state between the automatic guided vehicle 10 and the trolley C by moving the connecting section 22 using the drive apparatus 21.

FIG. 4 shows a state of the connecting mechanism 20 when the automatic guided vehicle 10 and the trolley C are not connected. FIG. 5 shows a state of the connecting mechanism 20 in the middle of connection of the automatic guided vehicle 10 and the trolley C. FIG. 6 shows a state of the connecting mechanism 20 when the automatic guided vehicle 10 and the trolley C are connected. In the following description, a state of the connecting mechanism 20 shown in FIG. 4 is simply referred to as "a disconnection state" and a state of the connecting mechanism 20 shown in FIG. 6 is simply referred to as "a connection state."

As shown in FIGS. 4 to 6, the connecting section 22 in the embodiment is a pin extending in the movable direction Y. The connecting section 22 has a substantially columnar shape about a central axis J extending in the movable direction Y. In the following description, a radial direction about the central axis J is simply referred to as "a radial direction" and a circumferential direction about the central axis J is simply referred to as "a circumferential direction."

As shown in FIG. 1, the guide member 60 for a section to be connected is fixed to a top plate section upper surface 13a that is an upper surface of the top plate 13. The top plate section upper surface 13a is an upper surface of the vehicle body 11. The guide member 60 for a section to be connected is disposed at a center of the top plate section upper surface 13a in the movable direction Y on a rear side in the entering direction X. As shown in FIGS. 3 and 4, the guide member 60 for a section to be connected has a fixed plate section 61 and a pair of guide sections 62 and 63. That is, the connecting mechanism 20 has the pair of guide sections 62 and 63. The fixed plate section 61 has a plate shape extending along a horizontal plane perpendicular to the vertical direction Z. The fixed plate section 61 extends in the entering direction X. The fixed plate section 61 is fixed to the top plate section upper surface 13a by a screw.

The pair of guide sections 62 and 63 have plate shapes standing upward from both end portions of the fixed plate section 61 in the movable direction Y. The pair of guide sections 62 and 63 extend in the entering direction X above the top plate section upper surface 13a, i.e., above the upper surface of the vehicle body 11. The pair of guide sections 62 and 63 are disposed to face each other in the movable direction Y via a gap DP into which the main body CA1 for a section to be connected is inserted. As shown in FIG. 4, both end portions of the pair of guide sections 62 and 63 in the entering direction X extend to be inclined in a direction in which one guide section is separated from the other facing guide section in the movable direction Y. Accordingly, a dimension of the gap DP in the movable direction Y is increased at both end portions in the entering direction X. For this reason, the section to be connected CA is easily inserted into the gap DP from both end portions of the gap DP in the entering direction X.

The guide section 62 has a first through-hole 62a passing through the guide section 62 in the movable direction Y. That is, one of the pair of guide sections 62 and 63 has the first through-hole 62a. The first through-hole 62a is formed in a portion of the guide section 62 on the rear side. A shape of the first through-hole 62a is, for example, a circular shape having a center through which the central axis J passes. The guide sections 62 and 63 are provided as a single member integrated with the fixed plate section 61.

In the following description, a side of the guide member 60 for a section to be connected closer to a center in the movable direction Y with respect to a certain subject is referred to as an inner side in the movable direction, and a side of the guide member 60 for a section to be connected far from the center in the movable direction Y is referred to as an outer side in the movable direction. In the embodiment, a center of the guide member 60 for a section to be connected in the movable direction Y is a center of the gap DP in the movable direction Y and a center of the vehicle body 11 in the movable direction Y.

The drive apparatus 21 moves the connecting section 22 in the movable direction Y to connect the connecting section 22 to the section to be connected CA. The drive apparatus 21 is disposed on one side of the guide member 60 for a section to be connected in the movable direction Y. The drive apparatus 21 is fixed to a surface of the guide section 62 on an outer side in the movable direction. As shown in FIG. 1, the drive apparatus 21 is fixed to the top plate section upper surface 13a. As shown in FIG. 4, the drive apparatus 21 has an actuator 30, a support section 40, a link member 50 and a tensile spring 80.

The support section 40 is fixed to the vehicle body 11. More specifically, the support section 40 is fixed to the top plate section upper surface 13a. A surface of the support section 40 on an inner side in the movable direction is fixed to a surface of the guide section 62 on an outer side in the movable direction. The support section 40 rotatably supports the link member 50. The support section 40 has a support section main body 41, a support section lid section 42, a bush 43 and a pressing screw 45. The support section main body 41 has, for example, a rectangular parallelepiped shape. The support section main body 41 has an accommodating hole section 41a passing through the support section main body 41 in the movable direction Y.

The accommodating hole section 41a accommodates at least a part of the connecting section 22. A shape of an inner side surface of the accommodating hole section 41a in the radial direction is, for example, a stepped cylindrical shape about the central axis J. The accommodating hole section 41a has a large diameter hole section 41b and a small diameter hole section 41c. The small diameter hole section 41c is connected to an end portion of the large diameter hole section 41b on the side of the guide member 60 for a section to be connected, i.e., on an inner side in the movable direction. An inner diameter of the small diameter hole section 41c is smaller than an inner diameter of the large diameter hole section 41b. An inner end portion of the small diameter hole section 41c in the movable direction is connected to the first through-hole 62a. The bush 43 having a cylindrical shape that supports the connecting section 22 is fitted into the small diameter hole section 41c. An inner side of the bush 43 in the radial direction is connected to the gap DP via the first through-hole 62a.

The support section main body 41 has a hole section 41d that opens on the side of the actuator 30 in the entering direction X, i.e., a front side, and a first connecting section 44 connected to the link member 50. That is, the support section 40 has the first connecting section 44. The first connecting section 44 is disposed in the hole section 41d. The first connecting section 44 is, for example, a pin extending in the vertical direction Z. Both end portions of the first connecting section 44 in the vertical direction Z are connected to an inner side surface of the hole section 41d. The first connecting section 44 is disposed between a movable section 32 (to be described below) of the actuator 30 and the connecting section 22 in the entering direction X, i.e., the horizontal direction.

The support section lid section 42 is fixed to an outer end portion of the support section main body 41 in the movable direction by a screw. The support section lid section 42 is a plate shape configured to cover an opening in the large diameter hole section 41b on an outer side in the movable direction. The pressing screw 45 is a screw fastened to an inner side in the movable direction from a surface of the support section lid section 42 on an outer side in the movable direction. An inner end portion of the pressing screw 45 in the movable direction is disposed in the large diameter hole section 41b. An inner end portion of the pressing screw 45 in the movable direction comes in contact with an outer end portion of the connecting section 22 in the movable direction in a disconnection state shown in FIG. 4. Accordingly, the connecting section 22 is positioned in the movable direction Y in the disconnection state.

The connecting section 22 is disposed to be movable in the movable direction Y in the horizontal direction above the top plate section upper surface 13a, i.e., above the upper surface of the vehicle body 11. More specifically, the connecting section 22 is disposed to be movable in the movable direction Y in the accommodating hole section 41a. The connecting section 22 has a connecting section main body 22a, a flange section 22b, a fixed section 22c and a second connecting section 22d.

The connecting section main body 22a extends in the movable direction Y. The connecting section main body 22a has a columnar shape about the central axis J. The connecting section main body 22a passes through the bush 43, i.e., the small diameter hole section 41c. The connecting section main body 22a is supported by the bush 43 in the radial direction. An inner end portion of the connecting section main body 22a in the movable direction has a hemispherical shape protruding inward in the movable direction. In the disconnection state shown in FIG. 4, an inner end portion of the connecting section main body 22a in the movable direction is disposed on an outer side of the gap DP in the movable direction and disposed in the first through-hole 62a. The connecting section main body 22a is disposed to be movable into the gap DP through the first through-hole 62a from the inside of the bush 43 in the radial direction, i.e., the inside of the small diameter hole section 41c in the radial direction. That is, the connecting section 22 is disposed to be movable through the first through-hole 62a in the movable direction Y.

The flange section 22b has an annular shape extending in the radial direction outward from an outer end portion of the connecting section main body 22a in the movable direction. An outer diameter of the flange section 22b is smaller than an inner diameter of the large diameter hole section 41b and larger than an inner diameter of the small diameter hole section 41c. The flange section 22b is disposed in the large diameter hole section 41b. The fixed section 22c protrudes toward an outer side in the movable direction from an outer end portion of the connecting section main body 22a in the movable direction. An outer end portion of the fixed section 22c in the movable direction comes in contact with the pressing screw 45 from an inner side in the movable direction in the disconnection state. The second connecting section 22d is provided on the fixed section 22c. The second connecting section 22d is connected to the link member 50. The second connecting section 22d is, for example, a pin extending in the vertical direction Z.

The actuator 30 is disposed on a front side of the support section 40. The actuator 30 changes a position of the connecting section 22 in the movable direction Y via the link member 50. The actuator 30 includes an actuator main body 31 and the movable section 32. The actuator main body 31 is fixed to the top plate 13 and the guide section 62 via an actuator fixing member 33. The actuator fixing member 33 has, for example, a plate shape extending in the movable direction Y. The actuator fixing member 33 is fixed to the top plate 13 by, for example, a screw. The actuator main body 31 is fixed to an outer end portion of the actuator fixing member 33 in the movable direction.

The movable section 32 is disposed on an inner end portion of the actuator main body 31 in the movable direction. The movable section 32 is attached to a position on the actuator main body 31, which is variable in the movable direction Y. In the movable section 32, a position in the movable direction Y is varied on the basis of an electrical signal input to the actuator main body 31. The movable section 32 moves in, for example, the movable direction Y. The movable section 32 has a third connecting section 32a connected to the link member 50. The third connecting section 32a is, for example, a pin extending in the vertical direction Z.

The actuator 30 is, for example, a solenoid actuator. The solenoid actuator is preferably a self-holding type solenoid actuator. While not shown, for example, a solenoid coil and a permanent magnet are provided on the actuator main body 31. In addition, the movable section 32 is formed of, for example, a magnetic material.

The movable section 32 receives a magnetic force in a direction in which the movable section 32 is attracted to a permanent magnet by the permanent magnet, i.e., a direction outward in the movable direction. The movable section 32 is switched to a state attracted to the permanent magnet, i.e., a state shown in FIG. 6 and a state separated from the permanent magnet, i.e., a state shown in FIG. 4, by a magnetic field generated through electrical conduction to a solenoid coil. Accordingly, a state of the connecting mechanism 20 is changed between the disconnection state and the connection state.

The link member 50 connects the movable section 32 and the connecting section 22. The link member 50 has, for example, an elongated plate shape. The link member 50 has a first connecting hole section 51, a second connecting hole section 52 and a third connecting hole section 53.

The first connecting hole section 51, the second connecting hole section 52 and the third connecting hole section 53 pass through the link member 50 in the vertical direction Z. The first connecting hole section 51 has, for example, a circular shape. The first connecting section 44 of the support section 40 passes through the first connecting hole section 51. Accordingly, the link member 50 is rotatably connected to the support section 40 around an axis of the first connecting section 44 extending in the vertical direction Z.

The second connecting hole section 52 is disposed at the link member 50 on the side of the connecting section 22, i.e., an rear end portion. The second connecting hole section 52 is, for example, a long hole extending in a direction in which the link member 50 extends. The second connecting section 22d of the connecting section 22 passes through the second connecting hole section 52. Accordingly, the link member 50 is rotatably connected to the connecting section 22 around an axis of the second connecting section 22d extending in the vertical direction Z.

The third connecting hole section 53 is disposed at the link member 50 on the side of the actuator 30, i.e., an end position on a front side. The third connecting hole section 53 is, for example, a long hole extending in a direction in which the link member 50 extends. The third connecting section 32a of the movable section 32 passes through the third connecting hole section 53. Accordingly, the link member 50 is rotatably connected to the movable section 32 around an axis of the third connecting section 32a extending in the vertical direction Z.

In the direction in which the link member 50 extends, a distance between the first connecting hole section 51 and the second connecting hole section 52 is larger than a distance between the first connecting hole section 51 and the third connecting hole section 53.

The tensile spring 80 is connected to the link member 50 and the actuator fixing member 33. The tensile spring 80 extends in the movable direction Y. An outer end portion of the tensile spring 80 in the movable direction is fixed to a front end portion of the link member 50. An inner end portion of the tensile spring 80 in the movable direction is fixed to the actuator fixing member 33. The tensile spring 80 applies an elastic force to the movable section 32 in an inward direction of the movable direction via the link member 50.

In the disconnection state shown in FIG. 4, the movable section 32 of the actuator 30 has a position separated from the permanent magnet (not shown) of the actuator 30 to an inner side in the movable direction. In the disconnection state, when current flows to a solenoid coil (not shown) of the actuator 30 in a predetermined direction, a magnetic field in the same direction as the magnetic field due to the permanent magnet is generated. Accordingly, the movable section 32 is pulled to the permanent magnet by the magnetic force to move outward in the movable direction.

Since the movable section 32 is moved outward in the movable direction, the link member 50 is rotated counterclockwise when seen from above using the first connecting section 44 and the first connecting hole section 51 as support points. Accordingly, the connecting section 22 is pressed inward in the movable direction by the link member 50, and as shown in FIG. 6, an inner end portion of the connecting section 22 in the movable direction is inserted into the gap DP. Since the connecting section 22 is inserted into the gap DP in this way and the connecting section 22 is inserted into the insertion hole CAh of the section to be connected CA in the gap DP, the connecting mechanism 20 can be connected to the section to be connected CA. Accordingly, the automatic guided vehicle 10 and the trolley C can be brought into the connection state.

Here, since the first connecting section 44 is disposed between the movable section 32 and the connecting section 22 in the entering direction X, as a distance in the entering direction X between the first connecting section 44 and the movable section 32 is smaller than a distance in the entering direction X between the first connecting section 44 and the connecting section 22, a stroke in the movable direction Y of the connecting section 22 moved via the link member 50 can be larger than a stroke of the movable section 32. Accordingly, for example, even when a solenoid actuator having a relatively small stroke is used as the actuator 30, the connecting section 22 is appropriately moved to be easily inserted into the insertion hole CAh. Accordingly, the connecting section 22 can be appropriately inserted into the insertion hole CAh while making the connecting mechanism 20 inexpensive using the solenoid actuator as the actuator 30.

In the connection state, the movable section 32 is attracted to the permanent magnet (not shown). A magnetic force between the permanent magnet and the movable section 32 is larger than an elastic force inward in the movable direction applied to the movable section 32 by the tensile spring 80 when the movable section 32 is attracted to the permanent magnet. For this reason, after being brought into the connection state shown in FIG. 6, even when supply of power to the actuator 30 is stopped, the connection state in which the connecting mechanism 20 is connected to the trolley C is maintained.

In the connection state, when current flows in a direction opposite to that in the case in which the actuator 30 is shifted from the disconnection state to the connection state to the solenoid coil (not shown), a magnetic field in a direction opposite to the magnetic field due to the permanent magnet is generated. Accordingly, the magnetic field due to the permanent magnet is canceled out and the movable section 32 is moved inward in the movable direction by the elastic force of the tensile spring 80. Accordingly, the connecting section 22 is moved outward in the movable direction and extracted from the insertion hole CAh. As a result, the connection state between the connecting mechanism 20 and the trolley C is released, and the connecting mechanism 20 is brought into the disconnection state shown in FIG. 4 again.

A magnetic force between the permanent magnet and the movable section 32 is smaller than an elastic force due to the tensile spring 80 in the disconnection state. For this reason, after becoming the disconnection state shown in FIG. 4, even when supply of power to the actuator 30 is stopped, the disconnection state in which the connection state between the connecting mechanism 20 and the trolley C is released is maintained.

As described above, in the connecting mechanism 20, the disconnection state and the connection state are switched. In the embodiment, since the actuator 30 serving as the solenoid actuator and the tensile spring 80 are used, only when a state is switched between the connection state and the disconnection state, power may be supplied from a battery to the actuator 30. That is, there is no need to supply power from the battery to the actuator 30 to maintain the disconnection state and the connection state. Accordingly, power consumption for driving the connecting mechanism 20 can be reduced.

According to the embodiment, since the connecting section 22 is moved in the movable direction Y in the horizontal direction and connected to the section to be connected CA of the trolley C, the automatic guided vehicle 10 and the trolley C are connected. For this reason, in comparison with the case in which the connecting section 22 is moved in the vertical direction Z, a dimension of the connecting mechanism 20 in the vertical direction Z is easily reduced. Accordingly, the automatic guided vehicle 10 having a structure that can be reduced in size in the vertical direction Z is obtained. Accordingly, even when the trolley C is a low floor trolley having a relatively small distance in the vertical direction Z between the frame section CB1 and the floor surface, the automatic guided vehicle 10 can enter below the trolley C and the trolley C can be moved by the automatic guided vehicle 10. In addition, according to the embodiment, since the trolley C can be manufactured by only attaching the section to be connected CA to a conventional trolley, the trolley C can be simply manufactured.

In addition, according to the embodiment, since the connecting section 22 is the pin extending in the movable direction Y and the connecting section 22 is inserted into the insertion hole CAh, the automatic guided vehicle 10 and the trolley C are connected. For this reason, the connecting mechanism 20 can be simply configured, and the automatic guided vehicle 10 and the trolley C are easily stably connected.

In addition, according to the embodiment, the pair of guide sections 62 and 63 disposed to face each other in the movable direction Y via the gap DP are provided, and the guide section 62 has the first through-hole 62a. Then, the connecting section 22 is disposed movably in the movable direction Y through the first through-hole 62a. For this reason, in the gap DP, the connecting section 22 can be inserted into the insertion hole CAh of the section to be connected CA. Accordingly, since relative movement of the section to be connected CA with respect to the automatic guided vehicle 10 in the movable direction Y can be minimized by the pair of guide sections 62 and 63 and the connecting section 22 is inserted into the insertion hole CAh, relative movement of the section to be connected CA with respect to the automatic guided vehicle 10 in the entering direction X can be minimized. Accordingly, after the automatic guided vehicle 10 and the trolley C are connected, connection between the automatic guided vehicle 10 and the trolley C can be stably maintained regardless of which direction the automatic guided vehicle 10 has moved. In addition, since the section to be connected CA of the trolley C can be guided by the guide sections 62 and 63, it is easily to make a position of the section to be connected CA become a position at which the connecting section 22 is easily inserted into the insertion hole CAh.

The automatic guided vehicle 10 further includes a control part (not shown). The control part controls the vehicle body 11 and the connecting mechanism 20, connects the automatic guided vehicle 10 and the trolley C, and moves the trolley C. A method of controlling the automatic guided vehicle 10 using the control part includes an entering process, a pressing process and an insertion process.

As shown in FIGS. 1 and 2, the entering process is a process of entering the automatic guided vehicle 10 below the trolley body CB while advancing in the entering direction X and inserting the main body CA1 for a section to be connected into the gap DP. Position coordinates of the trolley C are input to the control part. The control part moves the automatic guided vehicle 10 toward the trolley C on the basis of the input position coordinates of the trolley C. The position coordinates of the automatic guided vehicle 10 are input to the control part. Accordingly, the control part can move the automatic guided vehicle 10 toward the trolley C while sequentially recognizing a relative position between the automatic guided vehicle 10 and the trolley C. Accordingly, the control part can cause the automatic guided vehicle 10 to enter below the trolley C accurately, and can insert the main body CA1 for a section to be connected into the gap DP.

Here, the position coordinates of the trolley C input to the control part are, for example, coordinates at which a relative position between the section to be connected CA and the connecting section 22 becomes a position where the connecting section 22 can be inserted into the insertion hole CAh when the position coordinates of the automatic guided vehicle 10 reach the position coordinates of the trolley C.

As shown in FIG. 5, the pressing process is a process of moving the connecting section 22 toward the main body CA1 for a section to be connected in the movable direction Y and pressing the connecting section 22 against the main body CA1 for a section to be connected when the first through-hole 62a is disposed behind the insertion hole CAh in the entering direction X. The control part controls the connecting mechanism 20 and inserts the connecting section 22 into the gap DP after the main body CA1 for a section to be connected is inserted into the gap DP by the entering process and before the connecting section 22 can be inserted into the insertion hole CAh at a position of the main body CA1 for a section to be connected. In other words, the control part controls the connecting mechanism 20 and moves the connecting section 22 inward in the movable direction at the time the automatic guided vehicle 10 reaches a position before the input position coordinates of the trolley C by a predetermined distance. Accordingly, the connecting section 22 is pressed against the side surface of the main body CA1 for a section to be connected in the movable direction Y. When the connecting section 22 is pressed against the main body CA1 for a section to be connected, the trolley C is moved in the movable direction Y, and the main body CA1 for a section to be connected is pressed against a surface of the guide section 63 on an inner side in the movable direction.

The insertion process is a process of moving the automatic guided vehicle 10 toward a front side in the entering direction X and inserting the connecting section 22 into the insertion hole CAh while pressing the connecting section 22 against the main body CA1 for a section to be connected. The control part moves the automatic guided vehicle 10 forward in a state shown in FIG. 5. Here, an inner end portion of the connecting section 22 in the movable direction slides and moves while contacting with the side surface of the main body CA1 for a section to be connected. As shown in FIG. 6, when a position of the end portion of the connecting section 22 on the inner side in the movable direction reaches a position of the insertion hole CAh in the entering direction X, the connecting section 22 is inserted into the insertion hole CAh. In other words, when the position coordinates of the automatic guided vehicle 10 reach the position coordinates of the trolley C, the connecting section 22 is inserted into the insertion hole CAh. The connecting section 22 in the insertion process is in a state in which a force of moving the connecting section 22 from the actuator 30 toward an inner side in the movable direction has been already received. For this reason, in the insertion process, even though the control part does not send a control signal to the connecting mechanism 20, when the automatic guided vehicle 10 reaches the above-mentioned predetermined position, the connecting section 22 is automatically inserted into the insertion hole CAh. According to the above-mentioned processes, the automatic guided vehicle 10 is connected to the trolley C.

For example, it is considered that, even when the automatic guided vehicle 10 is moved to the position coordinates of the trolley C, an error may occur and the connecting section 22 cannot be inserted into the insertion hole CAh. On the other hand, according to the embodiment, before the position of the automatic guided vehicle 10 reaches the position coordinates of the trolley C, the connecting section 22 is moved, the automatic guided vehicle 10 is moved while pressing the connecting section 22 against the main body CA1 for a section to be connected, and the connecting section 22 is inserted into the insertion hole CAh. For this reason, even when an error occurs at a relative position between the automatic guided vehicle 10 and the trolley C, the connecting section 22 can be inserted into the insertion hole CAh by only shifting a position of a portion of the main body CA1 for a section to be connected pressed by the connecting section 22 and moving the automatic guided vehicle 10 forward as it is. Accordingly, it is easy to securely connect the automatic guided vehicle 10 and the trolley C.

The dimension of the main body CA1 for a section to be connected in the entering direction X can be appropriately determined according to a magnitude of an error of the position coordinates that can be generated. Specifically, dimensions in the entering direction X of portions disposed at both sides of the main body CA1 for a section to be connected in the entering direction of the insertion hole CAh are set to a maximum value or more of an error that can be generated. Accordingly, the connecting section 22 can be reliably pressed against the main body CA1 for a section to be connected at a side behind the insertion hole CAh using the above-mentioned control method. As a result, the automatic guided vehicle 10 and the trolley C can be more reliably connected. Even when a larger error occurs at the position coordinates as the dimension of the main body CA1 for a section to be connected in the entering direction X is increased, the automatic guided vehicle 10 and the trolley C can be more reliably connected. In the embodiment, since the position coordinates of the automatic guided vehicle 10 are input to the control part, an error of a relative position between the automatic guided vehicle 10 and the trolley C can be reduced. Accordingly, it is easy to make the dimension of the main body CA1 for a section to be connected in the entering direction X relatively small. Accordingly, it is hard to make the section to be connected CA interfere with the trolley C.

The present invention is not limited to the above-mentioned embodiment and another configuration and method can also be employed. In the following description, the same components as the description are designated by the same reference numerals and description thereof may be omitted.

The configuration of the connecting section 22 and the configuration of the section to be connected CA are not particularly limited as long as they can be connected to each other. The insertion hole CAh of the section to be connected CA may be, for example, a bottomed hole. In addition, a configuration in which the section to be connected CA has two members disposed at intervals in the entering direction X and the connecting section 22 is inserted between the two members may be provided. In addition, the configuration of the drive apparatus 21 is not particularly limited thereto as long as the connecting section 22 is moved in the movable direction Y.

In addition, the entering direction X in which the automatic guided vehicle 10 advances when connected to the trolley C may cross and may not perpendicular to the movable direction Y in which the connecting section 22 moves. In addition, the guide member 60 for a section to be connected may not be provided.

Second Embodiment

Figure 7:
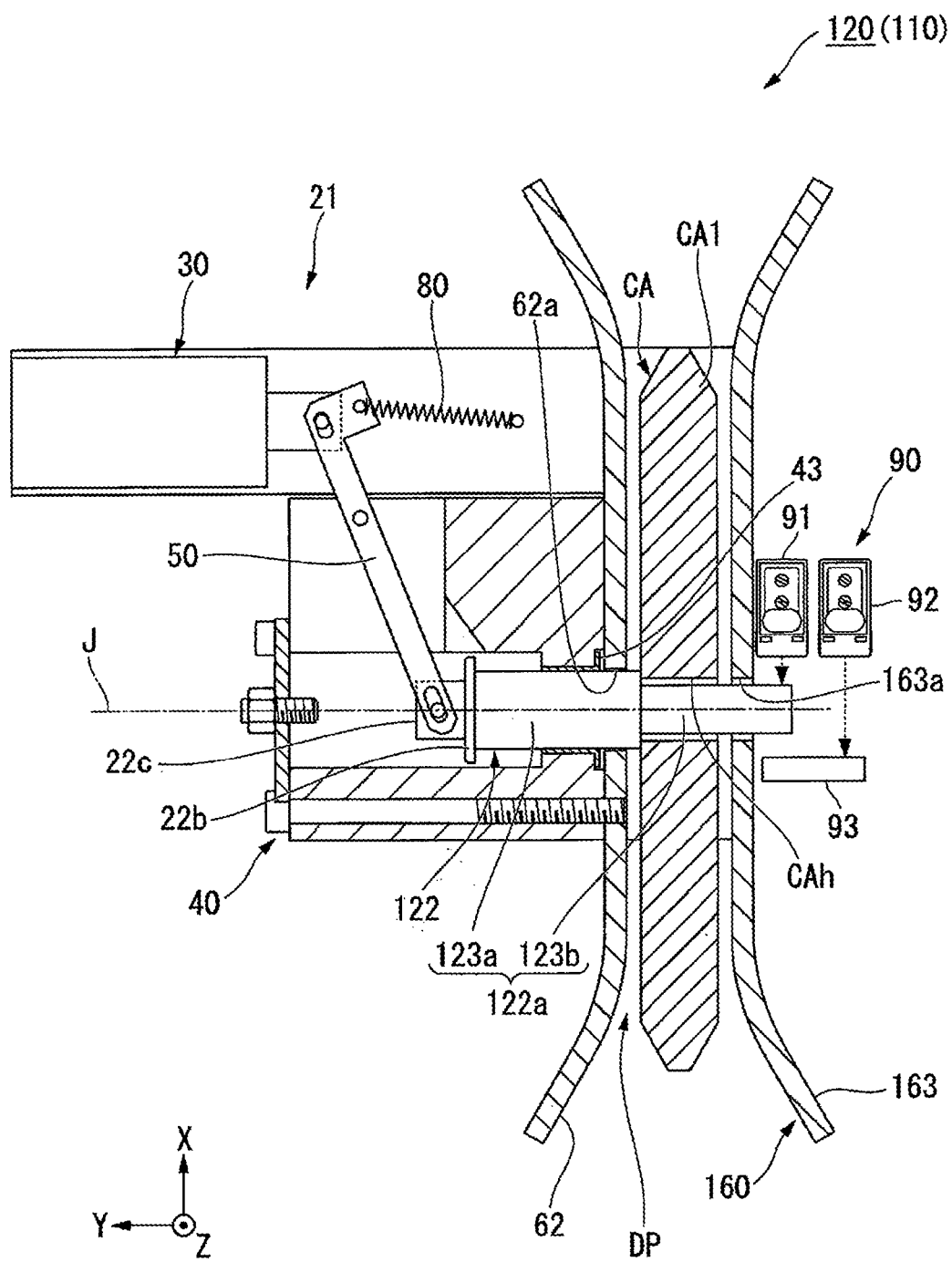
FIG. 7 is a cross-sectional view of a connecting mechanism of a second embodiment when seen from above.
Figure 8:
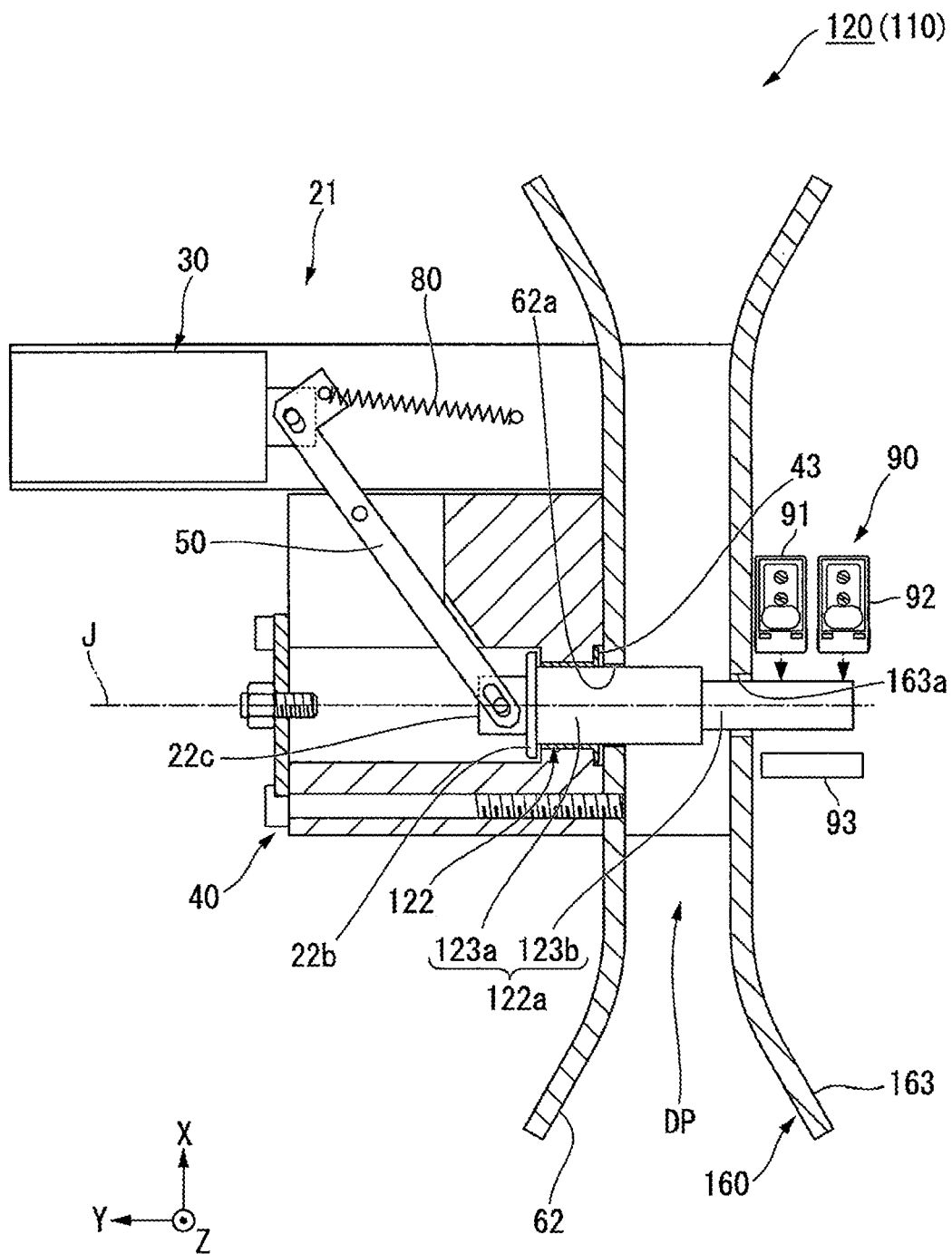
FIG. 8 is a cross-sectional view of the connecting mechanism of the second embodiment when seen from above.

FIG. 7 shows a case in which a connecting mechanism 120 of the embodiment is in a connection state. FIG. 8 shows a state in which the connecting mechanism 120 of the embodiment fails to be connected to the trolley C. As shown in FIG. 7, a guide section 163 in a guide member 160 for a section to be connected of the embodiment has a detection hole 163a passing through the guide section 163 in the movable direction Y. The guide section 163 is a guide section facing the guide section 62 having the first through-hole 62a via the gap DP in the movable direction Y. The detection hole 163a is disposed coaxially with the first through-hole 62a.

The connecting mechanism 120 of the embodiment has a sensor 90 and a reflecting member 93. The sensor 90 and the reflecting member 93 are disposed outside the guide section 163 in the movable direction. The sensor 90 is disposed in front of the detection hole 163a in the entering direction X. The sensor 90 has a first sensor 91 and a second sensor 92. The first sensor 91 and the second sensor 92 are disposed to be arranged in the movable direction Y. The second sensor 92 is disposed outside the first sensor 91 in the movable direction. The first sensor 91 and the second sensor 92 in the embodiment are reflection type photoelectric sensors. The reflecting member 93 is disposed to face the first sensor 91 and the second sensor 92 via a gap in the entering direction X. The reflecting member 93 is disposed behind the detection hole 163a in the entering direction X. The first sensor 91 and the second sensor 92 emit light rearward toward the reflecting member 93, and the reflecting member 93 reflects the light emitted from the first sensor 91 and the second sensor 92 toward a front side.

A connecting section main body 122a in a connecting section 122 of the embodiment is a stepped pin having an outer diameter that is reduced from a side to which the link member 50 is connected toward a side inserted into the insertion hole CAh. The connecting section main body 122a has a large diameter section 123a and a small diameter section 123b. The large diameter section 123a and the small diameter section 123b have a columnar shape about the central axis J. An outer diameter of the large diameter section 123a is larger than an outer diameter of the small diameter section 123b and smaller than an inner diameter of the bush 43. An outer diameter of the large diameter section 123a is larger than an inner diameter of the insertion hole CAh. The small diameter section 123b is connected to an inner end portion of the large diameter section 123a in the movable direction. An outer diameter of the small diameter section 123b is smaller than an inner diameter of the detection hole 163a.

The small diameter section 123b is inserted into the insertion hole CAh in the connection state shown in FIG. 7. In the connection state, a tip of the small diameter section 123b protrudes outward from the guide section 163 via the detection hole 163a in the movable direction. In the connection state, a tip of the small diameter section 123b is disposed inside an optical path of light emitted from the second sensor 92 in the movable direction and outside an optical path of light emitted from the first sensor 91 in the movable direction. The large diameter section 123a in the connection state comes in contact with an edge portion of the insertion hole CAh in the main body CA1 for a section to be connected. More specifically, the large diameter section 123a comes in contact with an edge portion of the insertion hole CAh in a surface of the main body CA1 for a section to be connected on an outer side in the movable direction from the outside in the movable direction. Accordingly, it is possible to minimize movement of the connecting section 122 toward a side at which the sensor 90 is disposed in the movable direction Y other than the position shown in FIG. 7, i.e., a right side in FIG. 7.

A method of controlling an automatic guided vehicle 110 using a control part according to the embodiment further includes a determination process. The determination process is a process of detecting a position on the connecting section 122 in the movable direction Y using the sensor 90 and determining whether the connecting section 122 is inserted into the insertion hole CAh or not. In the determination process, when the small diameter section 123b is inserted into the insertion hole CAh and a position of the connecting section 122 in the case in which the large diameter section 123a comes in contact with an edge portion of the main body CA1 for a section to be connected in the insertion hole CAh is detected by the sensor 90, it is determined that the connecting section 122 is inserted into the insertion hole CAh. That is, in the determination process, it is determined whether the connecting section 122 is inserted into the insertion hole CAh by detecting a position of the connecting section 122 in the above-mentioned connection state using the sensor 90.

Specifically, when the connecting mechanism 120 is in the connection state shown in FIG. 7, a tip of the small diameter section 123b blocks light emitted from the first sensor 91. For this reason, the first sensor 91 detects that the small diameter section 123b is disposed on an optical path of light emitted from the first sensor 91. Meanwhile, a tip of the small diameter section 123b in the connection state does not block light emitted from the second sensor 92. For this reason, the second sensor 92 does not detect the small diameter section 123b. In this way, when only the first sensor 91 of the sensors 90 detects the small diameter section 123b, the control part determines that the connecting section 122 is in a state inserted into the insertion hole CAh, and determines that the connecting mechanism 120 and the trolley C are connected.

Meanwhile, for example, when connection between the connecting mechanism 120 and the trolley C is failed, for example, when the connecting section 122 is inserted into the gap DP before the main body CA1 for a section to be connected is inserted into the gap DP, and so on, as shown in FIG. 8, the small diameter section 123b protrudes outward from the guide section 163 in the movable direction. In this state, a tip of the small diameter section 123b is disposed outside an optical path of light emitted from the second sensor 92 in the movable direction, and blocks both of light emitted from the first sensor 91 and light emitted from the second sensor 92. Accordingly, both of the first sensor 91 and the second sensor 92 detect the small diameter section 123b. In this way, when both of the first sensor 91 and the second sensor 92 detect the small diameter section 123b, the control part determines that the connecting section 122 is not inserted into the insertion hole CAh and determines that connection between the connecting mechanism 120 and the trolley C is failed. In this case, the control part returns the position of the connecting section 122 to a position in the disconnection state as shown in FIG. 4, and attempts to insert the connecting section 122 into the insertion hole CAh again. The control part stops the automatic guided vehicle 110 when connection between the connecting mechanism 120 and the trolley C is failed a plurality of times.

In addition, for example, the case in which the connecting section 122 is blocked due to foreign substances or the like sandwiched in the gap DP and the small diameter section 123b is not inserted into the detection hole 163a is also considered. For this reason, the control part determines that the connecting section 122 is not inserted into the insertion hole CAh and determines that connection between the connecting mechanism 120 and the trolley C is failed even when both of the first sensor 91 and the second sensor 92 do not detect the small diameter section 123b after an insertion operation of the connecting section 122 into the insertion hole CAh is performed.

As described above, according to the embodiment, it is possible to easily determine whether the automatic guided vehicle 110 is connected to the trolley C using a simple configuration or not. For this reason, it is easy to more reliably connect the automatic guided vehicle 110 to the trolley C.

Further, the first sensor 91 and the second sensor 92 may be any type of sensor as long as the small diameter section 123b can be detected. In addition, the sensor 90 is not particularly limited as long as a position of the connecting section 122 in the connection state can be detected. For example, the sensor 90 may be constituted by only one sensor that can detect a position of the small diameter section 123b in the movable direction Y.

Third Embodiment

In the following description, a positive side in the movable direction Y is referred to as "a left side" and a negative side is referred to as "a right side." The left side corresponds to one side in the first direction. The right side corresponds to the other side in the first direction.

Figure 9:
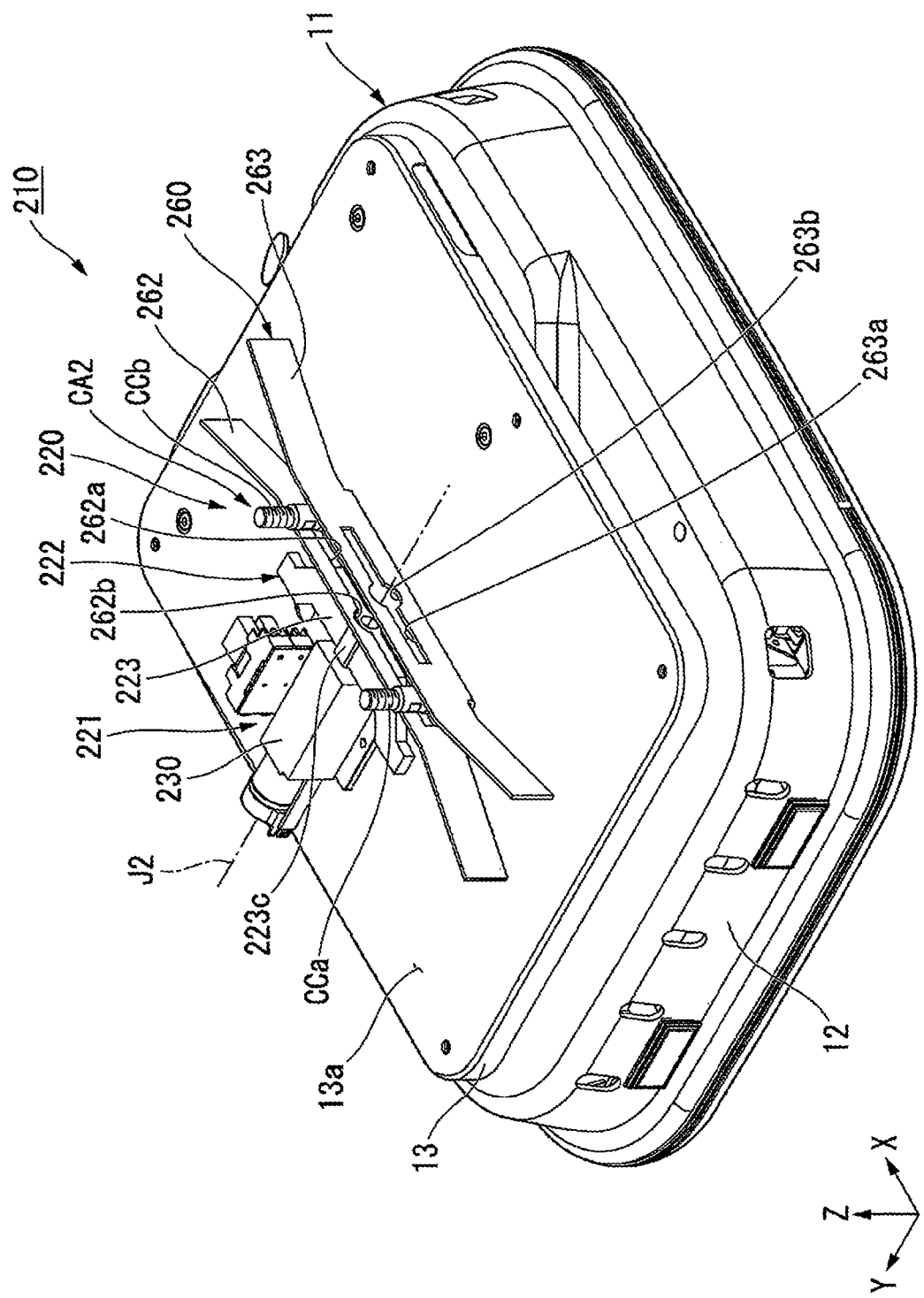
FIG. 9 is a perspective view showing an automatic guided vehicle of a third embodiment.
Figure 10:
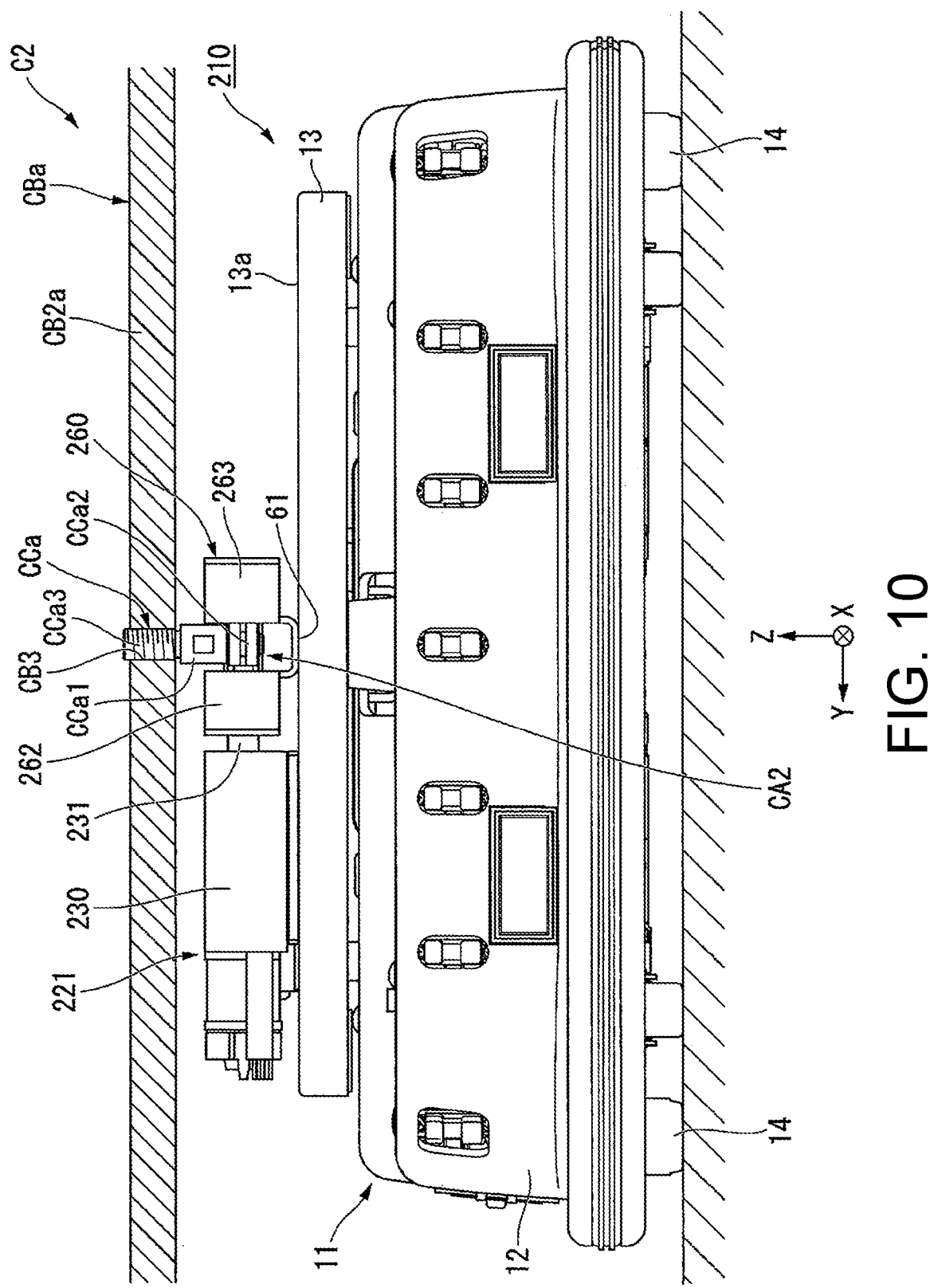
FIG. 10 is a view of the automatic guided vehicle of the third embodiment when seen from a rear side.

An automatic guided vehicle 210 of the embodiment shown in FIG. 9 is connected to a trolley C2 shown in FIG. 10 and moves the trolley C2. As shown in FIGS. 9 and 10, a section to be connected CA2 in the trolley C2 has a pair of shaft sections to be connected CCa and CCb. The pair of shaft sections to be connected CCa and CCb have a columnar shape extending in the vertical direction Z. The pair of shaft sections to be connected CCa and CCb protrude downward from a lower surface of the trolley body CBa. As shown in FIG. 9, the pair of shaft sections to be connected CCa and CCb are disposed at an interval in the entering direction X.

Further, since the shaft section to be connected CCa and the shaft section to be connected CCb have the same configuration except that disposed positions are different from each other, in the following description, only the shaft section to be connected CCa may be representatively described.

As shown in FIG. 10, the shaft section to be connected CCa has a shaft section main body CCa1, a rotation section CCa2 and a male screw section CCa3. The rotation section CCa2 is attached to a lower end portion of the shaft section main body CCa1. The rotation section CCa2 is rotatable with respect to the shaft section main body CCa1 around an axis of the shaft section to be connected CCa extending in the vertical direction Z. The rotation section CCa2 is, for example, a ball bearing. In the rotation section CCa2, for example, an inner wheel is fitted into a lower end portion of the shaft section main body CCa1 and fixed to the shaft section main body CCa1.

The male screw section CCa3 extends upward from an upper end portion of the shaft section main body CCa1. The male screw section CCa3 is screwed into a female screw section CB3 formed in the attachment plate section CB2a. Accordingly, the shaft section to be connected CCa protrudes downward from a lower surface of the trolley body CBa and is fixed to the trolley body CBa. According to the embodiment, since the trolley C2 can be manufactured by only screwing and fixing the pair of shaft sections to be connected CCa and CCb to a conventional trolley, manufacture of the trolley C2 can be further facilitated.

Figure 11:
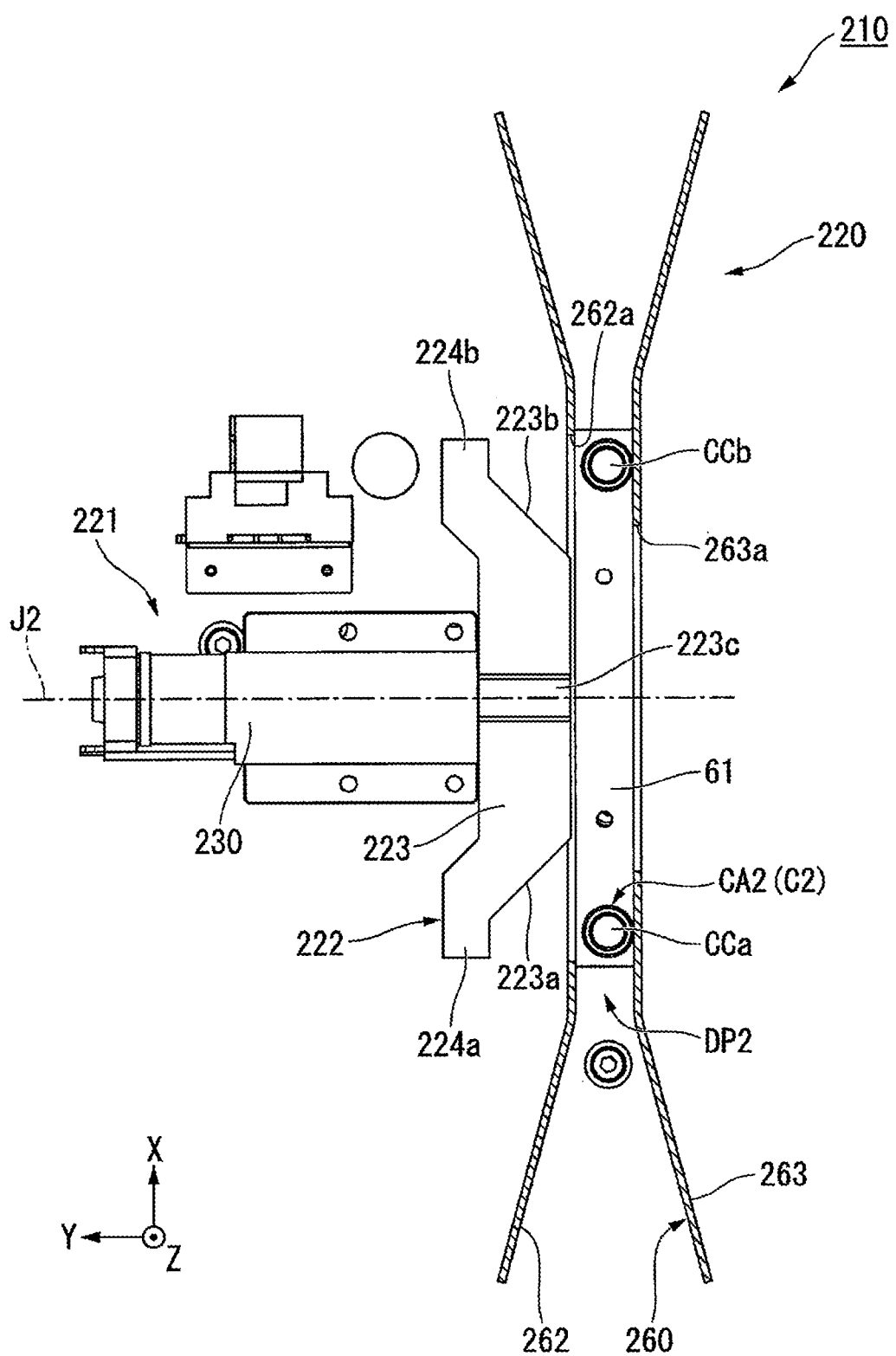
FIG. 11 is a partially cut cross-sectional view of a connecting mechanism of the third embodiment when seen from above.
Figure 12:
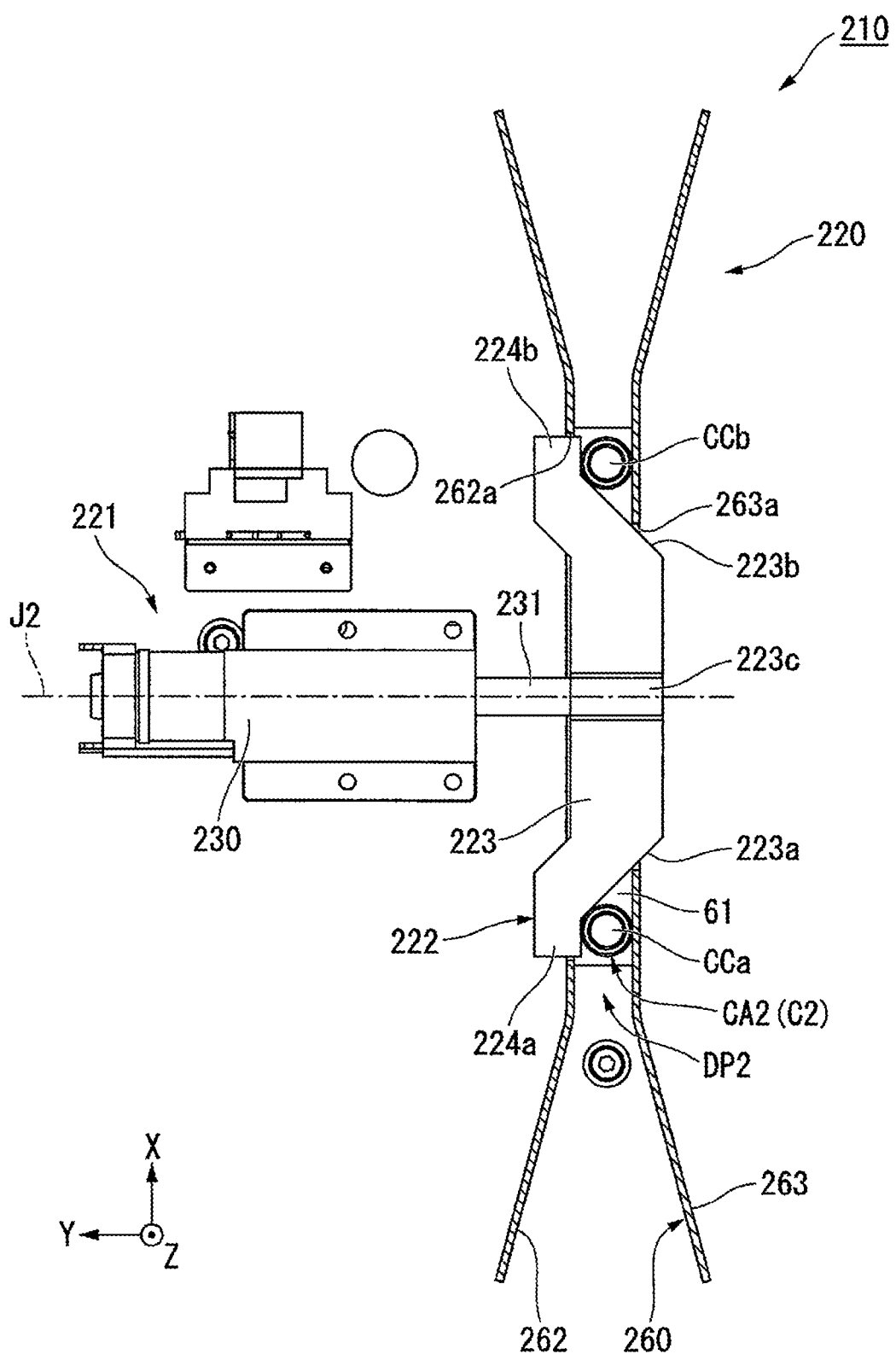
FIG. 12 is a partially cut cross-sectional view of the connecting mechanism of the third embodiment when seen from above.

A connecting mechanism 220 of the embodiment is connected to the trolley C2. FIGS. 9 and 11 show a case in which the connecting mechanism 220 is in a disconnection state. FIGS. 10 and 12 show a case in which the connecting mechanism 220 is in a connection state. As shown in FIG. 11, a guide member to be connected 260 in the connecting mechanism 220 of the embodiment has the fixed plate section 61, and a first guide section 262 and a second guide section 263 serving as a pair of guide sections. That is, the connecting mechanism 220 has the first guide section 262 and the second guide section 263.

The first guide section 262 and the second guide section 263 serving as the pair of guide sections are disposed to face each other in the movable direction Y via the gap DP2 into which the shaft sections to be connected CCa and CCb are inserted. An external form of the first guide section 262 is the same as that of the guide section 62 of the first embodiment and the second embodiment. An external form of the second guide section 263 is the same as that of the guide sections 63 and 163 of the first embodiment and the second embodiment.

The first guide section 262 is a guide section of the pair of guide section of the embodiment disposed on a left side. The first guide section 262 has a second through-hole 262a passing through the first guide section 262 in the movable direction Y. The second through-hole 262a is formed in a central portion of the first guide section 262 in the entering direction X. The second through-hole 262a extends in the entering direction X. A dimension of the second through-hole 262a in the entering direction X is larger than a distance between the shaft section to be connected CCa and the shaft section to be connected CCb in the entering direction X. As shown in FIG. 9, a shape of the second through-hole 262a when seen in the movable direction Y is a substantially rectangular shape elongated in the entering direction X.

A central portion 262b of the second through-hole 262a in the entering direction X has a dimension in the vertical direction Z larger than those of both side portions of the second through-hole 262a in the entering direction X. The central portion 262b of the second through-hole 262a has a circular shape about the central axis J2 when seen in the movable direction Y. The central axis J2 extends in the movable direction Y through a center of the first guide section 262 in the entering direction X and a center of the second guide section 263 in the entering direction X.

The second guide section 263 has a guide section disposed on a right side of the pair of guide sections of the embodiment. The second guide section 263 has a third through-hole 263a passing through the second guide section 263 in the movable direction Y. The third through-hole 263a is formed in a central portion of the second guide section 263 in the entering direction X. The third through-hole 263a extends in the entering direction X. A shape of the third through-hole 263a when seen in the movable direction Y is a substantially rectangular shape elongated in the entering direction X. A dimension of the third through-hole 263a in the entering direction X is smaller than that of the second through-hole 262a in the entering direction X. As shown in FIG. 11, a dimension of the third through-hole 263a in the entering direction X is smaller than a distance between the shaft section to be connected CCa and the shaft section to be connected CCb in the entering direction X. End portions of both sides of the third through-hole 263a in the entering direction are disposed on the side of the central axis J2 other than end portions of both sides of the second through-hole 262a in the entering direction.

As shown in FIG. 9, a central portion 263b of the third through-hole 263a in the entering direction X has a dimension in the vertical direction Z larger than that of both side portions of the third through-hole 263a in the entering direction X. The central portion 263b of the third through-hole 263a has a circular shape about the central axis J2 when seen in the movable direction Y. The third through-hole 263a overlaps the second through-hole 262a as a whole when seen in the movable direction Y.

A drive apparatus 221 in the connecting mechanism 220 moves the connecting section 222 in the movable direction Y to connect the connecting section 222 to the section to be connected CA2. An actuator 230 of the drive apparatus 221 according to the embodiment is, for example, an actuator configured to move an output shaft 231 shown in FIG. 12 in the movable direction Y using a ball screw mechanism. The output shaft 231 has a columnar shape extending in the movable direction Y about the central axis J2.

The connecting section 222 is fixed to a tip portion of the output shaft 231. As shown in FIG. 9, the connecting section 222 is a plate-shaped member having a plate surface perpendicular to the vertical direction Z. The connecting section 222 extends in the entering direction X as a whole. As shown in FIG. 11, the connecting section 222 has a connecting main body section 223 and a pair of protrusions 224a and 224b.

A shape of the connecting main body section 223 when seen from above is a trapezoidal shape having a dimension in the entering direction X that is increased from a right side toward a left side. Side surfaces 223a and 223b of both sides of the connecting main body section 223 in the entering direction are inclined to be separated from each other from the right side toward the left side. That is, the side surface 223a of the connecting main body section 223 on the rear side is disposed rearward from the right side toward the left side. The side surface 223b of the connecting main body section 223 on the front side is disposed forward from the right side toward the left side.

A dimension of the end portion of the connecting main body section 223 on the left side in the entering direction X is smaller than a dimension of the second through-hole 262a in the entering direction X, and greater than a dimension of the third through-hole 263a in the entering direction X. A dimension of the end portion of the connecting main body section 223 on the right side in the entering direction X is smaller than a dimension of the second through-hole 262a in the entering direction X and a dimension of the third through-hole 263a in the entering direction X.

As shown in FIG. 9, a central portion 223c of the connecting main body section 223 in the entering direction X protrudes from both side portions of the connecting main body section 223 in the entering direction X at both sides in the vertical direction Z, and has a large dimension in the vertical direction Z. The central portion 223c has a substantially quadrangular columnar shape extending in the movable direction Y. The central portion 223c extends from the end portion of the connecting main body section 223 on the left side to the end portion of the connecting main body section 223 on the right side. For example, a hole section that opens leftward is formed in the central portion 223c. The output shaft 231 is fitted and fixed into the hole section in the central portion 223c from the left side. Accordingly, the connecting section 222 is fixed to the output shaft 231.

As shown in FIG. 12, the connecting main body section 223 is disposed to be insertable into the gap DP2 through the second through-hole 262a from the left side of the first guide section 262. In the embodiment, the connecting main body section 223 can protrude from a left side of the first guide section 262 toward a right side of the second guide section 263 through the second through-hole 262a, the gap DP2 and the third through-hole 263a. Here, the central portion 223c of the connecting main body section 223 passes through the central portion 262b of the second through-hole 262a and the central portion 263b of the third through-hole 263a.

The connecting main body section 223 is inserted into the gap DP2 between the pair of shaft sections to be connected CCa and CCb in the entering direction X. In this state, when the trolley C2 is relatively move forward with respect to the automatic guided vehicle 210, the shaft section to be connected CCa comes in contact with the side surface 223a of the connecting main body section 223, and relative forward movement of the trolley C2 with respect to the automatic guided vehicle 210 is suppressed. In addition, when the trolley C2 is relatively moved rearward with respect to the automatic guided vehicle 210, the shaft section to be connected CCb comes in contact with the side surface 223b of the connecting main body section 223 and relative rearward movement of the trolley C2 with respect to the automatic guided vehicle 210 is suppressed. Accordingly, relative movement of the trolley C2 with respect to the automatic guided vehicle 210 in the entering direction X is suppressed by the connecting main body section 223. Meanwhile, relative movement of the trolley C2 with respect to the automatic guided vehicle 210 in the movable direction Y is suppressed by the first guide section 262 and the second guide section 263 disposed to face each other via the gap DP2 in the movable direction Y.

In this way, since the connecting main body section 223 is inserted between the shaft sections to be connected CCa and CCb, movement of the trolley C2 with respect to the automatic guided vehicle 210 in the entering direction X and the movable direction Y can be suppressed. Accordingly, since the connecting section 222 is moved rightward by the actuator 230 from the disconnection state shown in FIG. 11 and the connecting main body section 223 is inserted between the shaft sections to be connected CCa and CCb as shown in FIG. 12, the connecting mechanism 220 can be connected to the section to be connected CA2. Accordingly, the automatic guided vehicle 210 and the trolley C2 can be in the connection state. In the connection state, the shaft section to be connected CCa and the shaft section to be connected CCb sandwich the central axis J2 in the entering direction X. In the embodiment, a central position between the pair of shaft sections to be connected CCa and CCb in the entering direction X in the connection state is substantially the same position as the central axis J2 in the entering direction X.

According to the embodiment, since the connecting section 222 is moved in the movable direction Y in the horizontal direction and connected to the section to be connected CA2 of the trolley C2, the automatic guided vehicle 210 and the trolley C2 are connected. For this reason, in comparison with the case in which the connecting section 222 is moved in the vertical direction Z, a dimension of the connecting mechanism 220 in the vertical direction Z is easily reduced. Accordingly, like the first embodiment and the second embodiment, the automatic guided vehicle 210 having a structure that can be reduced in size in the vertical direction Z is obtained.

In addition, according to the embodiment, the side surfaces 223a and 223b of the connecting main body section 223 inserted between the pair of shaft sections to be connected CCa and CCb in the entering direction X are inclined to be separated from each other from the right side toward the left side. For this reason, when the central position between the pair of shaft sections to be connected CCa and CCb in the entering direction X is deviated from the central axis J2 according to leftward movement of the connecting main body section 223, one of the side surfaces 223a and 223b comes in contact with one of the shaft sections to be connected CCa and CCb, and the shaft sections to be connected CCa and CCb are moved in the entering direction X. Accordingly, a central position between the pair of shaft sections to be connected CCa and CCb in the entering direction X approaches the central axis J2. That is, a position of the trolley C2 with respect to the automatic guided vehicle 210 is adjusted to a position that becomes a connection state shown in FIG. 12.

Accordingly, even when positions of the shaft sections to be connected CCa and CCb in the entering direction X with respect to the connecting mechanism 220 are deviated, a position of the trolley C2 can be adjusted by the side surfaces 223a and 223b and the connecting mechanism 220 can be connected to the section to be connected CA2 as long as a right end portion of the connecting main body section 223 can be inserted between the pair of shaft sections to be connected CCa and CCb. For this reason, even when an error occurs at a relative position between the automatic guided vehicle 210 and the trolley C2, it is easy to reliably connect the automatic guided vehicle 210 and the trolley C2.

An interval between the pair of shaft sections to be connected CCa and CCb in the entering direction X is appropriately determined according to a magnitude of an error of position coordinates that can be obtained. Specifically, a difference between the interval of the pair of shaft sections to be connected CCa and CCb in the entering direction X and a dimension of the end portion of the connecting main body section 223 on the right side in the entering direction X is two times or more a maximum value of an error that can be obtained. Accordingly, for example, when a central position of the pair of shaft sections to be connected CCa and CCb in the entering direction X as shown in FIG. 11 is matched with the central axis J2, even though positions of the shaft sections to be connected CCa and CCb in the entering direction X are deviated within a maximum error range of a front side or a rear side, the connecting main body section 223 can be inserted between the shaft sections to be connected CCa and CCb. As a result, it is easy to more reliably connect the automatic guided vehicle 210 and the trolley C2.

As described above, in the embodiment, since an interval between the shaft sections to be connected CCa and CCb in the entering direction X and a dimension on a right end portion of the connecting main body section 223 in the entering direction X are respectively determined according to positioning accuracy of the automatic guided vehicle 210, reliably connection between the automatic guided vehicle 210 and the trolley C2 can be realized. Accordingly, the drive apparatus 221 may have a configuration in which the connecting section 222 can be simply moved in the movable direction Y. For this reason, the configuration of the drive apparatus 221 can be simplified and the configuration of the connecting mechanism 220 can be simplified. Accordingly, labors and costs for manufacturing the automatic guided vehicle 210 can be reduced.

In addition, in the embodiment, when the connecting mechanism 220 is in the connection state, for example, as shown in FIG. 5 in the first embodiment, there is no need to stop the position of the connecting section 222 on the way. For this reason, there is no need to select an actuator as the actuator 230 of the drive apparatus 221 in which a load is not likely to be applied, for example, when movement in the movable section is interfered with an external force like the solenoid actuator, and a degree of freedom of selecting the actuator 230 can be increased. In addition, there is no need to control the drive apparatus 221 and stop the connecting section 222 on the way, and the drive apparatus 221 can be simply controlled.

In addition, according to the embodiment, a portion of the section to be connected CA2 inserted into the gap DP2 between the first guide section 262 and the second guide section 263 is the pair of shaft sections to be connected CCa and CCb. For this reason, for example, after one of the pair of shaft sections to be connected CCa and CCb is inserted into the gap DP2, the automatic guided vehicle 210 can be rotated about an axis parallel to the vertical direction Z to vary a direction of the automatic guided vehicle 210, and the other of the pair of shaft sections to be connected CCa and CCb can be inserted into the gap DP2. Accordingly, for example, even when the automatic guided vehicle 210 approaches the trolley C2 in any direction of the horizontal direction, since the direction of the automatic guided vehicle 210 is controlled, the pair of shaft sections to be connected CCa and CCb can be inserted into the gap DP2. Accordingly, the automatic guided vehicle 210 and the trolley C2 can be more easily connected.

In addition, according to the embodiment, the pair of shaft sections to be connected are provided as the shaft section to be connected CCa and the shaft section to be connected CCb. For this reason, even when the automatic guided vehicle 210 is rotated around an axis parallel to the vertical direction Z in the connection state, relative rotation of the trolley C2 with respect to the automatic guided vehicle 210 can be suppressed. Accordingly, in the connection state, the trolley C2 can be stably rotated around an axis parallel to the vertical direction Z together with the automatic guided vehicle 210.

In addition, for example, if an inclination angle of the side surfaces 223a and 223b of the connecting main body section 223 with respect to a surface perpendicular to the movable direction Y is reduced, when the side surfaces 223a and 223b come in contact with the shaft sections to be connected CCa and CCb, it is considered that a force in the entering direction X is hard to be applied to the shaft sections to be connected CCa and CCb and the trolley C2 is hard to be appropriately matched with the entering direction X. For example, an inclination angle of the side surfaces 223a and 223b with respect to a surface perpendicular to the movable direction Y is easily reduced as a dimension of a right end portion of the connecting main body section 223 in the entering direction X is reduced.

On the other hand, according to the embodiment, the connecting main body section 223 protrudes rightward from the second guide section 263 through the second through-hole 262a, the gap DP2 and the third through-hole 263a. For this reason, it is easy to increase a dimension of the connecting main body section 223 in the movable direction Y, and it is possible to increase a distance in the movable direction Y to which the connecting main body section 223 moves when it becomes the connection state from the disconnection state. Accordingly, even when a dimension of a right end portion of the connecting main body section 223 in the entering direction X is reduced, an inclination angle of the side surfaces 223a and 223b with respect to a surface perpendicular to the movable direction Y can be relatively increased. Accordingly, the trolley C2 can be appropriately matched with the entering direction X while the connecting main body section 223 is easily inserted between the shaft sections to be connected CCa and CCb.

In addition, according to the embodiment, the shaft sections to be connected CCa and CCb have the rotation section CCa2. For this reason, when the shaft sections to be connected CCa and CCb are inserted into the gap DP2, even though the shaft sections to be connected CCa and CCb come in contact with the first guide section 262 or the second guide section 263, the rotation section CCa2 is rotated, and friction between the shaft sections to be connected CCa and CCb and the first guide section 262 or the second guide section 263 can be suppressed.

As shown in FIG. 11, the pair of protrusions 224a and 224b protrude from a left end portion of the connecting main body section 223 toward both sides in the entering direction. A shape of each of the protrusions 224a and 224b when seen from above is a substantially rectangular shape. The protrusion 224a protrudes rearward from a rear end portion of a left end portion of the connecting main body section 223. A front end portion of the protrusion 224a is connected to a left end portion of the connecting main body section 223. The protrusion 224b protrudes forward from a front end portion of a left end portion of the connecting main body section 223. A rear end portion of the protrusion 224b is connected to a left end portion of the connecting main body section 223. A distance in the entering direction X from a rear end portion of the protrusion 224a to a front end portion of the protrusion 224b is smaller than a dimension of the second through-hole 262a in the entering direction X and larger than a dimension of the third through-hole 263a in the entering direction X.

As shown in FIG. 12, the pair of protrusions 224a and 224b can be inserted into the gap DP2 through the second through-hole 262a and can face the pair of shaft sections to be connected CCa and CCb in the movable direction Y. For this reason, since the connecting section 222 is moved rightward and the pair of protrusions 224a and 224b are inserted into the gap DP2, the pair of shaft sections to be connected CCa and CCb can be sandwiched between the protrusions 224a and 224b and the second guide section 263. Accordingly, the pair of shaft sections to be connected CCa and CCb in the gap DP2 can be positioned in the movable direction Y. Accordingly, even when a width of the gap DP2 in the movable direction Y is relatively large, since the connecting mechanism 220 is in the connection state, relative movement of the trolley C2 with respect to the automatic guided vehicle 210 in the movable direction Y can be suppressed. For this reason, the trolley C2 can be stably connected to the automatic guided vehicle 210 while the shaft sections to be connected CCa and CCb are easily inserted into the gap DP2.

In the embodiment, right end portions of the protrusions 224a and 224b are inserted into the gap DP2. In the connection state, for example, a distance between the protrusions 224a and 224b and the second guide section 263 in the movable direction Y is slightly larger than an outer diameter of the shaft sections to be connected CCa and CCb.

Fourth Embodiment

Figure 13:
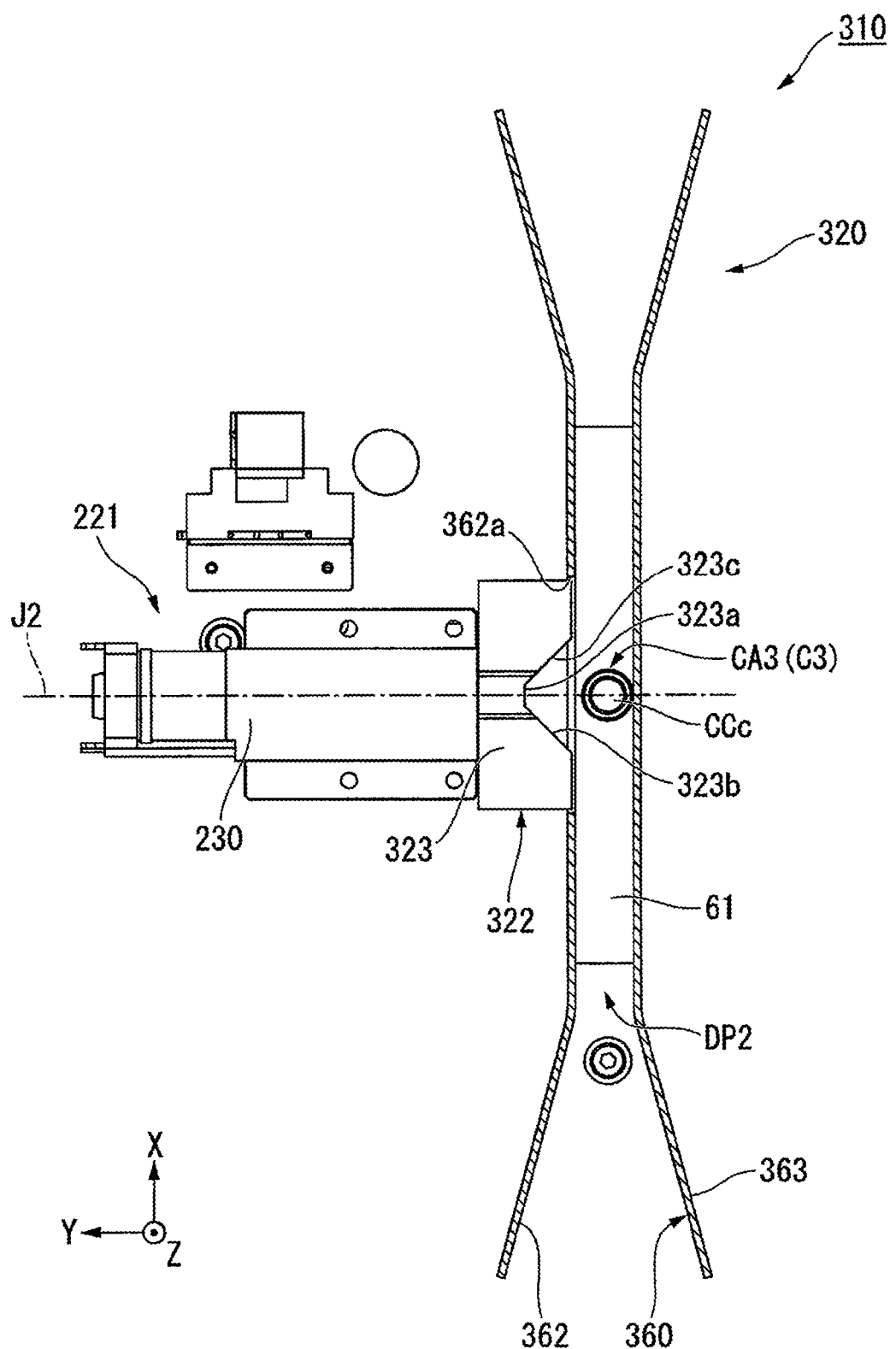
FIG. 13 is a partially cut cross-sectional view of a connecting mechanism of a fourth embodiment when seen from above.
Figure 14:
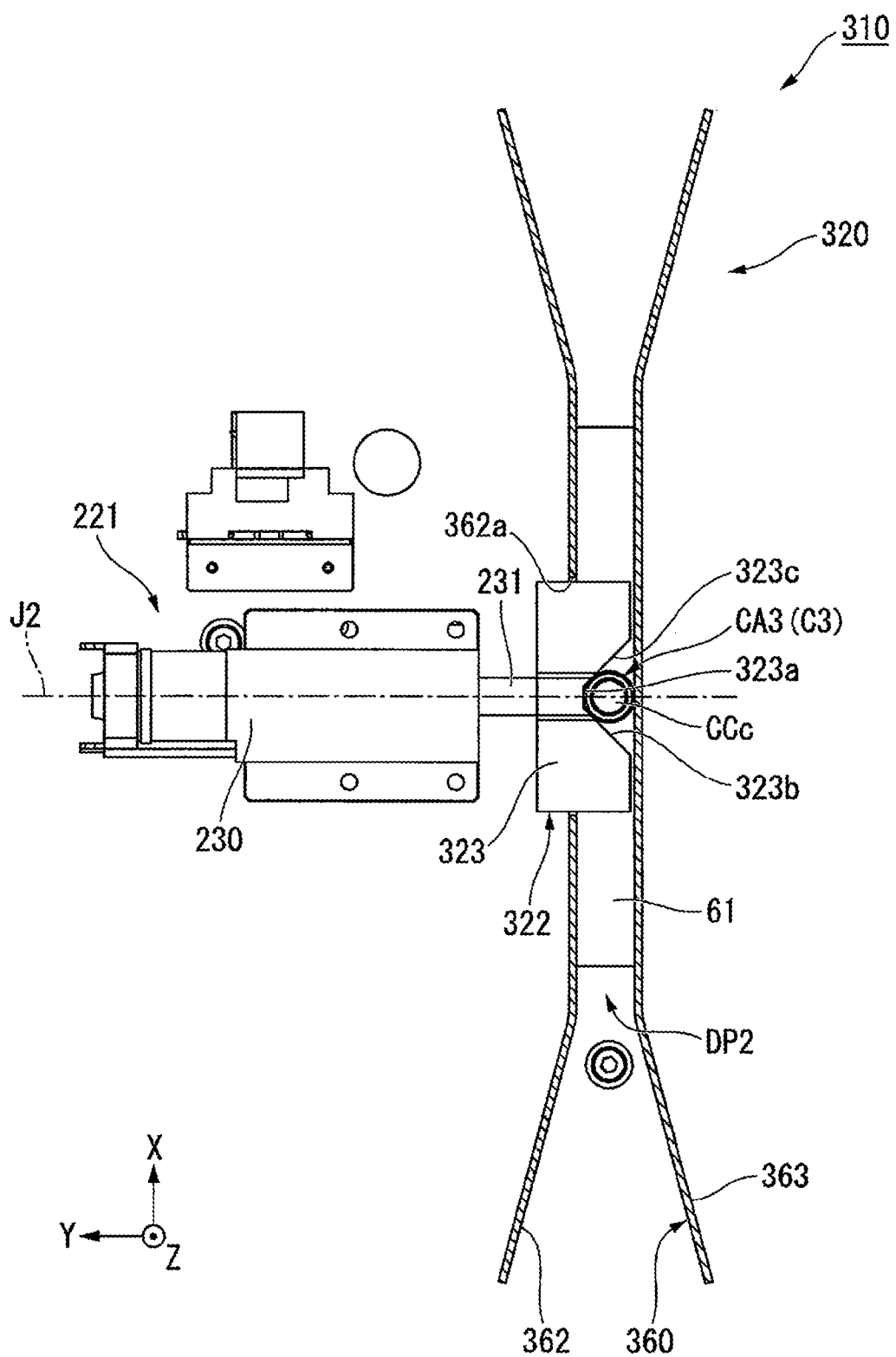
FIG. 14 is a partially cut cross-sectional view of the connecting mechanism of the fourth embodiment when seen from above.

As shown in FIGS. 13 and 14, in the embodiment, a section to be connected CA3 has a shaft section to be connected CCc. A configuration of the shaft section to be connected CCc is the same as that of the shaft section to be connected CCa of the third embodiment. The shaft section to be connected CCc is inserted into a center of the gap DP2 in the entering direction X when an automatic guided vehicle 310 is aligned to a trolley C3.

In a guide member 360 for a section to be connected of a connecting mechanism 320 of the embodiment, for example, a second through-hole 362a of a first guide section 362 has a dimension in the entering direction X that is smaller than that of the second through-hole 262a of the third embodiment. A second guide section 363 is distinguished from the second guide section 263 of the third embodiment in that a third through-hole is not provided. A configuration of the second guide section 363 is the same as that of the guide section 63 of the first embodiment.

A connecting main body section 323 in a connecting section 322 of the embodiment is a substantially rectangular plate-shaped member elongated in the entering direction X when seen from above. The connecting main body section 323 has a concave section 323a recessed from a right side to a left side. The concave section 323a is disposed at a center of the connecting main body section 323 in the entering direction X. Facing surfaces 323b and 323c that are both side surfaces of an inner side surface of the concave section 323a in the entering direction are inclined to be separated from each other from a left side to a right side. The facing surface 323b is disposed rearward from a left side toward a right side. The facing surface 323c is disposed forward from a left side toward a right side. The facing surface 323b and the facing surface 323c face each other in the entering direction X via a gap. A bottom surface of the concave section 323a is perpendicular to the movable direction Y.

A distance between the facing surface 323b and the facing surface 323c in the entering direction X is increased from a left side toward a right side. A distance between the facing surface 323b and the facing surface 323c in the entering direction X is larger than an outer diameter of the shaft section to be connected CCc in a right end portion of the concave section 323a and smaller than an outer diameter of the shaft section to be connected CCc in a left end portion of the concave section 323a. A distance between the facing surface 323b and the facing surface 323c in the entering direction X is a dimension of an inner portion of the concave section 323a in the entering direction X.

As shown in FIG. 14, since the connecting main body section 323 is inserted into the gap DP2 via the second through-hole 362a, the shaft section to be connected CCc in the gap DP2 is inserted into the concave section 323a. Accordingly, movement of the shaft section to be connected CCc in the entering direction X can be suppressed by the facing surface 323b and the facing surface 323c, and the automatic guided vehicle 310 and the trolley C3 are connected to each other. For example, a right end portion of the connecting main body section 323 in the connection state is disposed to be separated leftward from the second guide section 363.

According to the embodiment, even when an error occurs at a position of the shaft section to be connected CCc in the entering direction X, the shaft section to be connected CCc can be moved to a center of the concave section 323a in the entering direction X by the facing surfaces 323b and 323c as long as the shaft section to be connected CCc can be inserted into the concave section 323a. Accordingly, a position of the trolley C3 can be adjusted and the connecting mechanism 320 can be connected to the section to be connected CA3. Accordingly, even when an error occurs at a relative position between the automatic guided vehicle 310 and the trolley C3, it is easily to reliably connect the automatic guided vehicle 310 and the trolley C3.

In addition, according to the embodiment, since the shaft section to be connected CCc is one, even when the automatic guided vehicle 310 approaches the trolley C3 in any direction, the shaft section to be connected CCc can be inserted into the gap DP2 while a direction of the automatic guided vehicle 310 is not changed. In addition, according to the embodiment, since the trolley C3 can be manufactured by only screwing and fixing the one shaft section to be connected CCc to a conventional trolley, manufacture of the trolley C3 can be further facilitated.

The automatic guided vehicle of each of the above-mentioned embodiments may tow and move the trolley C or may push and move the trolley C.

The configurations may be appropriately combined within a range in which they are not mutually inconsistent.

Priority is claimed on Japanese Patent Application No. 2016-149864, filed Jul. 29, 2016, and Japanese Patent Application No. 2017-120730, filed Jun. 20, 2017, the contents of which are incorporated herein by reference.

The invention claimed is:

1. An automatic guided vehicle configured to move a trolley having a trolley body, wheels attached to the trolley body, and a section to be connected provided on a lower surface of the trolley body, the automatic guided vehicle comprising:
a vehicle body;
drive wheels attached to the vehicle body; and
a connecting mechanism connected to the trolley,
wherein the connecting mechanism has:
a connecting section disposed above an upper surface of the vehicle body to be movable in a first direction in a horizontal direction; and
a drive apparatus for moving the connecting section in the first direction and connecting the connecting section to the section to be connected,
wherein the connecting section is a pin extending in the first direction, and
the section to be connected has an insertion hole into which the connecting section is inserted,
wherein the section to be connected has a main body for a section to be connected extending in a second direction crossing the first direction in the horizontal direction,
the insertion hole is formed in the main body for a section to be connected,
the connecting mechanism has a pair of guide sections extending in the second direction above an upper surface of the vehicle body,
the pair of guide sections are disposed to face each other in the first direction via a gap into which the main body for a section to be connected is inserted,
one of the pair of guide sections has a first through-hole through which the guide section passes in the first direction, and
the connecting section is disposed to be movable through the first through-hole in the first direction.

2. The automatic guided vehicle according to claim 1, wherein the drive apparatus comprises:
an actuator having a movable section, a position in the first direction of which is varied according to an electrical signal;
a link member configured to connect the movable section and the connecting section; and
a support section fixed to the vehicle body and configured to rotatably support the link member,
the support section has a first connecting section connected to the link member, and
the first connecting section is disposed between the movable section and the connecting section in a horizontal direction.

3. The automatic guided vehicle according to claim 2, wherein the actuator is a solenoid actuator.

4. A method of controlling the automatic guided vehicle according to claim 1, the method comprising:
a process of causing the automatic guided vehicle to enter below the trolley body while advancing in the second direction, and inserting the main body for a section to be connected into the gap;
a process of moving the connecting section toward the main body for a section to be connected in the first direction and pressing the connecting section against the main body for a section to be connected when the first through-hole is disposed behind the insertion hole in the second direction; and
a process of moving the automatic guided vehicle forward in the second direction and inserting the connecting section into the insertion hole while pressing the connecting section against the main body for a section to be connected.

5. The method of controlling the automatic guided vehicle according to claim 4, further comprising a determination process of detecting a position of the connecting section in the first direction using a sensor and determining whether the connecting section is inserted into the insertion hole or not,
wherein the connecting section has:
a small diameter section inserted into the insertion hole; and
a large diameter section having an outer diameter larger than an inner diameter of the insertion hole, and
in the determination process, it is determined that the connecting section is inserted into the insertion hole when a position of the connecting section is detected by the sensor in the case in which the small diameter section is inserted into the insertion hole and the large diameter section comes in contact with an edge portion of the insertion hole in the main body for a section to be connected.

6. The automatic guided vehicle according to claim 3, wherein the connecting section is a pin extending in the first direction, and
the section to be connected has an insertion hole into which the connecting section is inserted.

7. The automatic guided vehicle according to claim 6, wherein the section to be connected has a main body for a section to be connected extending in a second direction crossing the first direction in the horizontal direction,
the insertion hole is formed in the main body for a section to be connected,
the connecting mechanism has a pair of guide sections extending in the second direction above an upper surface of the vehicle body,
the pair of guide sections are disposed to face each other in the first direction via a gap into which the main body for a section to be connected is inserted,
one of the pair of guide sections has a first through-hole through which the guide section passes in the first direction, and
the connecting section is disposed to be movable through the first through-hole in the first direction.

8. A method of controlling the automatic guided vehicle according to claim 7, the method comprising:
a process of causing the automatic guided vehicle to enter below the trolley body while advancing in the second direction, and inserting the main body for a section to be connected into the gap;
a process of moving the connecting section toward the main body for a section to be connected in the first direction and pressing the connecting section against the main body for a section to be connected when the first through-hole is disposed behind the insertion hole in the second direction; and
a process of moving the automatic guided vehicle forward in the second direction and inserting the connecting section into the insertion hole while pressing the connecting section against the main body for a section to be connected.

9. The method of controlling the automatic guided vehicle according to claim 8, further comprising a determination process of detecting a position of the connecting section in the first direction using a sensor and determining whether the connecting section s inserted into the insertion hole or not,
wherein the connecting section has:
a small diameter section inserted into the insertion hole; and
a large diameter section having an outer diameter larger than an inner diameter of the insertion hole, and
in the determination process, it is determined that the connecting section is inserted into the insertion hole when a position of the connecting section is detected by the sensor in the case in which the small diameter section is inserted into the insertion hole and the large diameter section comes in contact with an edge portion of the insertion hole in the main body for a section to be connected.

10. The automatic guided vehicle according to claim 2, wherein the connecting section is a pin extending in the first direction, and
the section to be connected has an insertion hole into which the connecting section is inserted.

11. The automatic guided vehicle according to claim 10, wherein the section to be connected has a main body for a section to be connected extending in a second direction crossing the first direction in the horizontal direction,
the insertion hole is formed in the main body for a section to be connected,
the connecting mechanism has a pair of guide sections extending in the second direction above an upper surface of the vehicle body,
the pair of guide sections are disposed to face each other in the first direction via a gap into which the main body for a section to be connected is inserted,
one of the pair of guide sections has a first through-hole through which the guide section passes in the first direction, and
the connecting section is disposed to be movable through the first through-hole in the first direction.

12. A method of controlling the automatic guided vehicle according to claim 11, the method comprising:
a process of causing the automatic guided vehicle to enter below the trolley body while advancing in the second direction, and inserting the main body for a section to be connected into the gap;
a process of moving the connecting section toward the main body for a section to be connected in the first direction and pressing the connecting section against the main body for a section to be connected when the first through-hole is disposed behind the insertion hole in the second direction; and
a process of moving the automatic guided vehicle forward in the second direction and inserting the connecting section into the insertion hole while pressing the connecting section against the main body for a section to be connected.

13. The method of controlling the automatic guided vehicle according to claim 12, further comprising a determination process of detecting a position of the connecting section in the first direction using a sensor and determining whether the connecting section is inserted into the insertion hole or not,
wherein the connecting section has:
a small diameter section inserted into the insertion hole; and
a large diameter section having an outer diameter larger than an inner diameter of the insertion hole, and
in the determination process, it is determined that the connecting section is inserted into the insertion hole when a position of the connecting section is detected by the sensor in the case in which the small diameter section is inserted into the insertion hole and the large diameter section comes in contact with an edge portion of the insertion hole in the main body for a section to be connected.

14. An automatic guided vehicle configured to move a trolley having a trolley body, wheels attached to the trolley body, and a section to be connected provided on a lower surface of the trolley body, the automatic guided vehicle comprising:
a vehicle body;
drive wheels attached to the vehicle body; and
a connecting mechanism connected to the trolley,
wherein the connecting mechanism has:
a connecting section disposed above an upper surface of the vehicle body to be movable in a first direction in a horizontal direction; and a drive apparatus for moving the connecting section in the first direction and connecting the connecting section to the section to be connected, wherein the section to be connected has a pair of shaft sections to be connected protruding downward from a lower surface of the trolley body, the pair of shaft sections to be connected are disposed with an interval therebetween in a second direction crossing the first direction in the horizontal direction, the connecting mechanism has a pair of guide sections extending in the second direction above the upper surface of the vehicle body, the pair of guide sections are disposed to face each other in the first direction via a gap into which the shaft sections to be connected is inserted, a first guide section of the pair of guide sections that is the guide section disposed at one side in the first direction has a second through-hole through which the first guide section passes in the first direction, the connecting section has a connecting main body section disposed to be insertable into the gap through the second through-hole from one side of the first guide section in the first direction, the connecting main body section is inserted between the pair of shaft sections to be connected in the gap in the second direction, and side surfaces of both sides of the connecting main body section in the second direction are inclined to be separated from each other from the other side in the first direction toward one side in the first direction.

15. The automatic guided vehicle according to claim 14, wherein the connecting section has a pair of protrusions protruding from one end portion of the connecting main body section in the first direction toward both sides in the second direction, and the pair of protrusions are able to be inserted into the gap through the second through-hole and able to face the pair of shaft sections to be connected in the first direction.

16. The automatic guided vehicle according to claim 14, wherein a second guide section of the pair of guide sections that is the guide section disposed at the other side in the first direction has a third through-hole passing through the second guide section in the first direction, and the connecting main body section is able to protrude from one side of the first guide section in the first direction toward the other side in the first direction through the second through-hole, the gap and the third through-hole from the second guide section.

17. An automatic guided vehicle configured to move a trolley having a trolley body, wheels attached to the trolley body, and a section to be connected provided on a lower surface of the trolley body, the automatic guided vehicle comprising:

a vehicle body;

drive wheels attached to the vehicle body; and a connecting mechanism connected to the trolley, wherein the connecting mechanism has:

a connecting section disposed above an upper surface of the vehicle body to be movable in a first direction in a horizontal direction; and a drive apparatus for moving the connecting section in the first direction and connecting the connecting section to the section to be connected, wherein the section to be connected has a shaft section to be connected protruding downward from a lower surface of the trolley body, the connecting mechanism has a pair of guide sections extending in a second direction crossing the first direction in the horizontal direction above an upper surface of the vehicle body, the pair of guide sections are disposed to face each other in the first direction via a gap into which the shaft section to be connected is inserted, a first guide section of the pair of guide sections that is the guide section disposed on one side in the first direction has a second through-hole passing through the first guide section in the first direction, the connecting section has a connecting main body section disposed to be insertable into the gap through the second through-hole from one side of the first guide section in the first direction, the connecting main body section has a concave section recessed from other side in the first direction toward one side in the first direction, the shaft section to be connected in the gap is inserted into the concave section, and both side surfaces of an inner side surface of the concave section in the second direction are inclined to be separated from each other from one side in the first direction toward the other side in the first direction.

* * * * *